(12) United States Patent
George et al.

(10) Patent No.: US 8,111,998 B2
(45) Date of Patent: Feb. 7, 2012

(54) TRANSPONDER SYSTEMS AND METHODS FOR RADIO-OVER-FIBER (ROF) WIRELESS PICOCELLULAR SYSTEMS

(75) Inventors: Jacob George, Horseheads, NY (US); Andrey Kobyakov, Painted Post, NY (US); Michael Sauer, Corning, NY (US)

(73) Assignee: Corning Cable Systems LLC, Hickory, NC (US)

( * ) Notice: Subject to any disclaimer, the term of this patent is extended or adjusted under 35 U.S.C. 154(b) by 1373 days.

(21) Appl. No.: 11/703,016

(22) Filed: Feb. 6, 2007

(65) Prior Publication Data
US 2008/0186143 A1 Aug. 7, 2008

(51) Int. Cl.
*H04B 10/00* (2006.01)
(52) U.S. Cl. .................................. 398/115; 398/128
(58) Field of Classification Search .................. 398/115, 398/116, 117, 118, 128, 130
See application file for complete search history.

(56) References Cited

U.S. PATENT DOCUMENTS

| | | | |
|---|---|---|---|
| 4,365,865 A | 12/1982 | Stiles | |
| 4,867,527 A | 9/1989 | Dotti et al. | |
| 4,889,977 A | 12/1989 | Haydon | 235/375 |
| 4,896,939 A | 1/1990 | O'Brien | 350/96.23 |
| 4,916,460 A | 4/1990 | Powell | |
| 5,039,195 A | 8/1991 | Jenkins et al. | |
| 5,042,086 A | 8/1991 | Cole et al. | |
| 5,125,060 A | 6/1992 | Edmundson | |
| 5,189,718 A | 2/1993 | Barrett et al. | |
| 5,189,719 A | 2/1993 | Coleman et al. | |
| 5,210,812 A | 5/1993 | Nilsson et al. | |
| 5,260,957 A | 11/1993 | Hakimi et al. | 372/39 |
| 5,268,971 A | 12/1993 | Nilsson et al. | |
| 5,301,056 A | 4/1994 | O'Neill | |
| 5,339,058 A | 8/1994 | Lique | |
| 5,339,184 A | 8/1994 | Tang | |
| 5,377,035 A | 12/1994 | Wang et al. | |
| 5,379,455 A | 1/1995 | Koschek | |

(Continued)

FOREIGN PATENT DOCUMENTS

AU 645192 B 10/1992

(Continued)

OTHER PUBLICATIONS

Schubert, H. et al., "Wireless Access to ATM-Network Based on Optical Microwave Generation," Vehicular Technology Conference, 1997, IEEE, vol. 1, May 4, 1997, pp. 275-279.

(Continued)

*Primary Examiner* — M. R. Sedighian
(74) *Attorney, Agent, or Firm* — C. Keith Montgomery

(57) ABSTRACT

Transponder systems and methods for radio-over-fiber (RoF) wireless picocellular system are disclosed. One type of transponder system includes a RoF transponder used in combination with at least one radiation-reflector assembly to provide for enhanced antenna directivity of the transponder. Another type of transponder system is a transponder node assembly, wherein two or more transponders are integrated into a single assembly, thereby reducing cost while facilitating RoF wireless picocellular system deployment. Another type of transponder system provides one or more transponders in a RoF wireless picocellular system with radio-frequency identification (RFID) tags, and uses an RFID tag reader to locate and read information from the transponders, as well as to perform transponder mode selection. Another type of transponder system is directed to a tether cable assembly that includes a dispensible/retractable coiled tether cable housed in a protective housing for connecting the tether cable to a transponder.

11 Claims, 17 Drawing Sheets

U.S. PATENT DOCUMENTS

| | | | |
|---|---|---|---|
| 5,400,391 A | 3/1995 | Emura et al. | 379/59 |
| 5,424,864 A | 6/1995 | Emura | 359/173 |
| 5,444,564 A | 8/1995 | Newberg | |
| 5,457,557 A | 10/1995 | Zarem et al. | 359/121 |
| 5,459,727 A | 10/1995 | Vannucci | |
| 5,469,523 A | 11/1995 | Blew et al. | |
| 5,539,393 A | 7/1996 | Barfod | |
| 5,543,000 A | 8/1996 | Lique | |
| 5,546,443 A | 8/1996 | Raith | |
| 5,557,698 A | 9/1996 | Gareis et al. | |
| 5,574,815 A | 11/1996 | Kneeland | |
| 5,598,288 A | 1/1997 | Collar | |
| 5,615,034 A | 3/1997 | Hori | |
| 5,627,879 A | 5/1997 | Russell et al. | 379/59 |
| 5,640,678 A | 6/1997 | Ishikawa et al. | |
| 5,642,405 A | 6/1997 | Fischer et al. | |
| 5,644,622 A | 7/1997 | Russell et al. | 455/422 |
| 5,648,961 A | 7/1997 | Ebihara | 370/282 |
| 5,651,081 A | 7/1997 | Blew et al. | |
| 5,668,562 A | 9/1997 | Cutrer et al. | |
| 5,677,974 A | 10/1997 | Elms et al. | |
| 5,682,256 A | 10/1997 | Motley et al. | 359/117 |
| 5,703,602 A | 12/1997 | Casebolt | |
| 5,790,606 A | 8/1998 | Dent | |
| 5,802,473 A | 9/1998 | Rutledge et al. | |
| 5,805,983 A | 9/1998 | Naidu et al. | |
| 5,812,296 A | 9/1998 | Tarusawa et al. | |
| 5,818,619 A | 10/1998 | Medved et al. | |
| 5,821,510 A | 10/1998 | Cohen et al. | 235/375 |
| 5,825,651 A | 10/1998 | Gupta et al. | |
| 5,838,474 A | 11/1998 | Stilling | |
| 5,852,651 A | 12/1998 | Fischer et al. | |
| 5,854,986 A | 12/1998 | Dorren et al. | |
| 5,867,485 A | 2/1999 | Chambers et al. | 370/281 |
| 5,867,763 A | 2/1999 | Dean et al. | |
| 5,880,867 A | 3/1999 | Ronald | |
| 5,881,200 A | 3/1999 | Burt | 385/142 |
| 5,883,882 A | 3/1999 | Schwartz | |
| 5,896,568 A | 4/1999 | Tseng et al. | |
| 5,903,834 A | 5/1999 | Wallstedt et al. | |
| 5,910,776 A | 6/1999 | Black | 340/825.35 |
| 5,913,003 A | 6/1999 | Arroyo et al. | |
| 5,917,636 A | 6/1999 | Wake et al. | |
| 5,930,682 A | 7/1999 | Schwartz et al. | |
| 5,936,754 A | 8/1999 | Ariyavisitakul et al. | 359/145 |
| 5,943,372 A | 8/1999 | Gans et al. | |
| 5,946,622 A | 8/1999 | Bojeryd | |
| 5,949,564 A | 9/1999 | Wake | |
| 5,959,531 A | 9/1999 | Gallagher, III et al. | |
| 5,960,344 A | 9/1999 | Mahany | |
| 5,969,837 A | 10/1999 | Farber et al. | 359/132 |
| 5,983,070 A | 11/1999 | Georges et al. | |
| 5,987,303 A | 11/1999 | Dutta et al. | |
| 6,005,884 A | 12/1999 | Cook et al. | |
| 6,006,105 A | 12/1999 | Rostoker et al. | |
| 6,014,546 A | 1/2000 | Georges et al. | |
| 6,016,426 A | 1/2000 | Bodell | |
| 6,023,625 A | 2/2000 | Myers, Jr. | |
| 6,049,312 A * | 4/2000 | Lord et al. | 343/781 P |
| 6,088,381 A | 7/2000 | Myers, Jr. | |
| 6,127,917 A | 10/2000 | Tuttle | |
| 6,128,470 A | 10/2000 | Naidu et al. | |
| 6,148,041 A | 11/2000 | Dent | |
| 6,150,921 A | 11/2000 | Werb et al. | |
| 6,157,810 A | 12/2000 | Georges et al. | |
| 6,232,870 B1 | 5/2001 | Garber et al. | 340/10.1 |
| 6,236,789 B1 | 5/2001 | Fitz | |
| 6,240,274 B1 | 5/2001 | Izadpanah | |
| 6,268,946 B1 | 7/2001 | Larkin et al. | 359/173 |
| 6,292,673 B1 | 9/2001 | Maeda et al. | |
| 6,314,163 B1 | 11/2001 | Acampora | |
| 6,323,980 B1 | 11/2001 | Bloom | |
| 6,324,391 B1 | 11/2001 | Bodell | |
| 6,337,754 B1 | 1/2002 | Imajo | 359/174 |
| 6,353,406 B1 | 3/2002 | Lanzl et al. | |
| 6,353,600 B1 | 3/2002 | Schwartz et al. | |
| 6,359,714 B1 | 3/2002 | Imajo | |
| 6,374,078 B1 | 4/2002 | Williams et al. | |
| 6,374,124 B1 | 4/2002 | Slabinski | |
| 6,405,018 B1 | 6/2002 | Reudink et al. | |
| 6,405,058 B2 | 6/2002 | Bobier | |
| 6,405,308 B1 | 6/2002 | Gupta et al. | |
| 6,438,301 B1 | 8/2002 | Johnson et al. | |
| 6,438,371 B1 | 8/2002 | Fujise et al. | 455/422 |
| 6,477,154 B1 | 11/2002 | Cheong et al. | |
| 6,486,907 B1 | 11/2002 | Farber et al. | |
| 6,496,290 B1 | 12/2002 | Lee | |
| 6,501,965 B1 | 12/2002 | Lucidarme | 455/562 |
| 6,504,636 B1 | 1/2003 | Seto et al. | |
| 6,512,478 B1 | 1/2003 | Chien | |
| 6,519,395 B1 | 2/2003 | Bevan | |
| 6,525,855 B1 | 2/2003 | Westbrook et al. | |
| 6,556,551 B1 | 4/2003 | Schwartz | |
| 6,577,794 B1 | 6/2003 | Currie et al. | |
| 6,577,801 B2 | 6/2003 | Broderick et al. | 385/125 |
| 6,580,905 B1 | 6/2003 | Naidu et al. | |
| 6,580,918 B1 | 6/2003 | Leickel et al. | |
| 6,583,763 B2 | 6/2003 | Judd | |
| 6,594,496 B2 | 7/2003 | Schwartz | |
| 6,597,325 B2 | 7/2003 | Judd et al. | |
| 6,606,430 B2 | 8/2003 | Bartur et al. | |
| 6,634,811 B1 | 10/2003 | Gertel et al. | |
| 6,636,747 B2 | 10/2003 | Harada et al. | |
| 6,640,103 B1 | 10/2003 | Inman et al. | 455/446 |
| 6,643,437 B1 | 11/2003 | Park | |
| 6,652,158 B2 | 11/2003 | Bartur et al. | |
| 6,654,616 B1 | 11/2003 | Pope, Jr. et al. | |
| 6,675,294 B1 | 1/2004 | Gupta et al. | |
| 6,687,437 B1 | 2/2004 | Starnes et al. | |
| 6,690,328 B2 | 2/2004 | Judd | |
| 6,704,545 B1 | 3/2004 | Wala | |
| 6,710,366 B1 | 3/2004 | Lee et al. | 257/14 |
| 6,731,880 B2 | 5/2004 | Westbrook et al. | |
| 6,768,913 B1 | 7/2004 | Molnar et al. | 455/562.1 |
| 6,771,862 B2 | 8/2004 | Karnik et al. | |
| 6,771,933 B1 | 8/2004 | Eng et al. | |
| 6,784,802 B1 | 8/2004 | Stanescu | 340/687 |
| 6,785,558 B1 | 8/2004 | Stratford et al. | |
| 6,788,666 B1 | 9/2004 | Linebarger et al. | 370/338 |
| 6,801,767 B1 | 10/2004 | Schwartz et al. | 455/426.2 |
| 6,807,374 B1 | 10/2004 | Imajo et al. | |
| 6,812,824 B1 * | 11/2004 | Goldinger et al. | 340/10.1 |
| 6,812,905 B2 | 11/2004 | Thomas et al. | |
| 6,826,337 B2 | 11/2004 | Linnell | |
| 6,847,856 B1 | 1/2005 | Bohannon | 700/115 |
| 6,865,390 B2 | 3/2005 | Goss et al. | |
| 6,873,823 B2 | 3/2005 | Hasarchi et al. | |
| 6,879,290 B1 | 4/2005 | Toutain et al. | |
| 6,883,710 B2 | 4/2005 | Chung | |
| 6,885,846 B1 | 4/2005 | Panasik et al. | |
| 6,889,060 B2 | 5/2005 | Fernando et al. | |
| 6,895,185 B1 | 5/2005 | Chung et al. | |
| 6,909,399 B1 | 6/2005 | Zegelin et al. | |
| 6,915,058 B2 | 7/2005 | Pons | 385/135 |
| 6,920,330 B2 | 7/2005 | Caronni et al. | |
| 6,924,997 B2 | 8/2005 | Chen et al. | 365/145 |
| 6,930,987 B1 | 8/2005 | Fukuda et al. | |
| 6,931,183 B2 | 8/2005 | Panak et al. | 385/101 |
| 6,933,849 B2 | 8/2005 | Sawyer | |
| 6,963,289 B2 | 11/2005 | Aljadeff et al. | |
| 6,963,552 B2 | 11/2005 | Sabat, Jr. et al. | |
| 6,965,718 B2 | 11/2005 | Koertel | |
| 6,968,107 B2 | 11/2005 | Belardi et al. | 385/127 |
| 6,970,652 B2 | 11/2005 | Zhang et al. | |
| 6,973,243 B2 | 12/2005 | Koyasu et al. | 385/100 |
| 6,974,262 B1 | 12/2005 | Rickenbach | |
| 7,006,465 B2 | 2/2006 | Toshimitsu et al. | |
| 7,013,087 B2 | 3/2006 | Suzuki et al. | 398/115 |
| 7,020,473 B2 | 3/2006 | Splett | |
| 7,035,512 B2 | 4/2006 | Van Bijsterveld | |
| 7,039,399 B2 | 5/2006 | Fischer | |
| 7,047,028 B2 | 5/2006 | Cagenius | |
| 7,053,838 B2 | 5/2006 | Judd | |
| 7,054,513 B2 | 5/2006 | Herz et al. | 385/12 |
| 7,072,586 B2 | 7/2006 | Aburakawa et al. | |
| 7,082,320 B2 | 7/2006 | Kattukaran et al. | |
| 7,084,769 B2 | 8/2006 | Bauer et al. | |

| | | |
|---|---|---|
| 7,106,931 B2 | 9/2006 | Sutehall et al. |
| 7,127,176 B2 | 10/2006 | Sasaki |
| 7,142,503 B1 | 11/2006 | Grant et al. |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,263,293 B2 | 8/2007 | Ommodt et al. |
| 7,269,311 B2 | 9/2007 | Kim et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,324,730 B2 | 1/2008 | Varkey et al. |
| 7,343,164 B2 | 3/2008 | Kallstenius |
| 7,349,633 B2 | 3/2008 | Lee et al. |
| 7,359,408 B2 | 4/2008 | Kim |
| 7,359,647 B1 | 4/2008 | Faria et al. |
| 7,366,150 B2 | 4/2008 | Lee et al. |
| 7,379,669 B2 | 5/2008 | Kim |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,424,228 B1 | 9/2008 | Williams et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,496,070 B2 | 2/2009 | Vesuna |
| 7,496,384 B2 * | 2/2009 | Seto et al. .................. 455/562.1 |
| 7,522,552 B2 | 4/2009 | Fein et al. |
| 7,548,695 B2 | 6/2009 | Wake |
| 7,565,170 B2 | 7/2009 | Buscaglia et al. |
| 7,590,354 B2 | 9/2009 | Sauer et al. |
| 2002/0003645 A1 | 1/2002 | Kim et al. |
| 2002/0048071 A1 | 4/2002 | Suzuki et al. |
| 2002/0075906 A1 | 6/2002 | Cole et al. |
| 2002/0092347 A1 | 7/2002 | Niekerk et al. ............... 73/146.2 |
| 2002/0111192 A1 | 8/2002 | Thomas et al. ................ 455/562 |
| 2002/0114038 A1 | 8/2002 | Arnon et al. |
| 2002/0126967 A1 | 9/2002 | Panak et al. |
| 2002/0130778 A1 | 9/2002 | Nicholson |
| 2002/0141020 A1 | 10/2002 | Doucet et al. |
| 2002/0181668 A1 | 12/2002 | Masoian et al. ............. 379/56.3 |
| 2002/0190845 A1 | 12/2002 | Moore |
| 2003/0007214 A1 | 1/2003 | Aburakawa et al. |
| 2003/0016418 A1 | 1/2003 | Westbrook et al. |
| 2003/0034963 A1 | 2/2003 | Moon et al. |
| 2003/0045284 A1 | 3/2003 | Copley et al. |
| 2003/0078074 A1 | 4/2003 | Sesay et al. |
| 2003/0141962 A1 | 7/2003 | Barink |
| 2003/0161637 A1 | 8/2003 | Yamamoto et al. |
| 2003/0165287 A1 | 9/2003 | Krill et al. |
| 2003/0174099 A1 | 9/2003 | Bauer et al. |
| 2003/0179077 A1 | 9/2003 | Hartmann et al. ........... 340/10.2 |
| 2003/0202794 A1 | 10/2003 | Izadpanah et al. |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst ............................. 370/328 |
| 2004/0041714 A1 | 3/2004 | Forster ....................... 340/870.17 |
| 2004/0043764 A1 | 3/2004 | Bigham et al. .............. 455/422.1 |
| 2004/0047313 A1 | 3/2004 | Rumpf et al. ................ 370/335 |
| 2004/0078151 A1 | 4/2004 | Aljadeff et al. |
| 2004/0100930 A1 | 5/2004 | Shapira et al. |
| 2004/0110469 A1 | 6/2004 | Judd et al. |
| 2004/0149736 A1 | 8/2004 | Clothier ........................ 219/627 |
| 2004/0151503 A1 | 8/2004 | Kashima et al. |
| 2004/0157623 A1 | 8/2004 | Splett |
| 2004/0162115 A1 | 8/2004 | Smith et al. ................ 455/562.1 |
| 2004/0162116 A1 | 8/2004 | Han et al. |
| 2004/0202257 A1 | 10/2004 | Mehta et al. .................. 375/267 |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0218873 A1 | 11/2004 | Nagashima et al. |
| 2004/0224644 A1 * | 11/2004 | Wu et al. ............................. 455/88 |
| 2004/0233877 A1 | 11/2004 | Lee et al. ...................... 370/338 |
| 2004/0258105 A1 | 12/2004 | Spathas et al. ................ 370/539 |
| 2004/0264683 A1 | 12/2004 | Bye |
| 2005/0052287 A1 | 3/2005 | Whitesmith et al. ...... 340/825.72 |
| 2005/0058451 A1 | 3/2005 | Ross ................................. 398/70 |
| 2005/0068179 A1 | 3/2005 | Roesner ......................... 340/572.1 |
| 2005/0068251 A1 * | 3/2005 | Ebling et al. .................. 343/911 L |
| 2005/0076982 A1 | 4/2005 | Metcalf et al. ............. 152/152.1 |
| 2005/0078006 A1 | 4/2005 | Hutchins et al. |
| 2005/0093679 A1 | 5/2005 | Zai et al. |
| 2005/0099343 A1 | 5/2005 | Asrani et al. ................... 343/702 |
| 2005/0116821 A1 | 6/2005 | Wilsey et al. |
| 2005/0141545 A1 | 6/2005 | Fein et al. |
| 2005/0143077 A1 | 6/2005 | Charbonneau |
| 2005/0148306 A1 | 7/2005 | Hiddink ......................... 455/101 |
| 2005/0159108 A1 | 7/2005 | Fletcher et al. |
| 2005/0174236 A1 | 8/2005 | Brookner |
| 2005/0201761 A1 | 9/2005 | Bartur et al. |
| 2005/0219050 A1 | 10/2005 | Martin |
| 2005/0224585 A1 | 10/2005 | Durrant et al. ................. 235/492 |
| 2005/0226625 A1 | 10/2005 | Wake et al. |
| 2005/0232636 A1 | 10/2005 | Durrant et al. ................. 398/139 |
| 2005/0242188 A1 | 11/2005 | Vesuna |
| 2005/0252971 A1 | 11/2005 | Howarth et al. |
| 2005/0259930 A1 | 11/2005 | Elkins, II et al. ............. 385/100 |
| 2005/0266797 A1 | 12/2005 | Utsumi et al. ...................... 455/7 |
| 2005/0266854 A1 | 12/2005 | Niiho et al. |
| 2005/0271396 A1 | 12/2005 | Iannelli |
| 2006/0002326 A1 | 1/2006 | Vesuna |
| 2006/0014548 A1 | 1/2006 | Bolin et al. |
| 2006/0017633 A1 | 1/2006 | Pronkine |
| 2006/0045054 A1 | 3/2006 | Utsumi et al. |
| 2006/0062579 A1 | 3/2006 | Kim et al. |
| 2006/0094470 A1 | 5/2006 | Wake et al. |
| 2006/0104643 A1 | 5/2006 | Lee et al. |
| 2006/0182446 A1 | 8/2006 | Kim et al. |
| 2006/0182449 A1 | 8/2006 | Iannelli et al. |
| 2006/0189354 A1 | 8/2006 | Lee et al. ...................... 455/561 |
| 2006/0233506 A1 | 10/2006 | Noonan et al. ................. 385/134 |
| 2006/0239630 A1 | 10/2006 | Hase et al. |
| 2006/0279460 A1 | 12/2006 | Yun et al. |
| 2007/0009266 A1 | 1/2007 | Bothwell et al. |
| 2007/0019679 A1 | 1/2007 | Scheck et al. |
| 2007/0058978 A1 | 3/2007 | Lee et al. |
| 2007/0093273 A1 | 4/2007 | Cair |
| 2007/0122155 A1 * | 5/2007 | Hillis et al. ..................... 398/115 |
| 2007/0149250 A1 | 6/2007 | Crozzoli et al. |
| 2007/0166042 A1 | 7/2007 | Seeds et al. ................. 398/142 |
| 2007/0253714 A1 | 11/2007 | Seeds et al. ................. 398/115 |
| 2007/0274279 A1 | 11/2007 | Wood et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0026765 A1 | 1/2008 | Charbonneau |
| 2008/0031628 A1 | 2/2008 | Dragas et al. |
| 2008/0056167 A1 | 3/2008 | Kim et al. |
| 2008/0058018 A1 | 3/2008 | Scheinert |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0137635 A1 | 6/2008 | Pan et al. |
| 2008/0145061 A1 | 6/2008 | Lee et al. |
| 2008/0150514 A1 | 6/2008 | Codreanu et al. |
| 2008/0194226 A1 | 8/2008 | Rivas et al. |
| 2008/0212969 A1 | 9/2008 | Fasshauer et al. |
| 2008/0219670 A1 | 9/2008 | Kim et al. |
| 2008/0232799 A1 | 9/2008 | Kim |
| 2008/0247716 A1 | 10/2008 | Thomas et al. |
| 2008/0253773 A1 | 10/2008 | Zheng |
| 2008/0260388 A1 | 10/2008 | Kim et al. |
| 2008/0273844 A1 | 11/2008 | Kewitsch |
| 2008/0298813 A1 | 12/2008 | Song et al. |

| | | | |
|---|---|---|---|
| 2008/0304831 A1 | 12/2008 | Miller, II et al. | |
| 2008/0310848 A1 | 12/2008 | Yasuda et al. | |
| 2009/0041413 A1 | 2/2009 | Hurley | |
| 2009/0047023 A1 | 2/2009 | Pescod et al. | |
| 2009/0061939 A1 | 3/2009 | Andersson et al. | |
| 2009/0103919 A1* | 4/2009 | Mickelsson et al. | 398/48 |
| 2009/0135078 A1 | 5/2009 | Lindmark et al. | |
| 2009/0154621 A1 | 6/2009 | Shapira et al. | |

FOREIGN PATENT DOCUMENTS

| | | |
|---|---|---|
| AU | 731180 | 3/1998 |
| CA | 2065090 C | 4/1992 |
| CA | 2242707 A1 | 1/1999 |
| DE | 20104862 U1 | 8/2001 |
| DE | 10249414 A1 | 5/2004 |
| EP | 0477952 A2 | 4/1992 |
| EP | 0461583 B1 | 3/1997 |
| EP | 0687400 B1 | 11/1998 |
| EP | 0993124 A2 | 4/2000 |
| EP | 1267447 B1 | 1/2001 |
| EP | 1173034 A1 | 4/2001 |
| EP | 1202475 A2 | 5/2002 |
| EP | 1363352 A1 | 11/2003 |
| EP | 1455550 A2 | 3/2004 |
| EP | 1443687 A1 | 8/2004 |
| EP | 1501206 A1 | 1/2005 |
| EP | 1391897 A1 | 2/2005 |
| EP | 1503451 A1 | 2/2005 |
| EP | 1530316 A1 | 5/2005 |
| EP | 1511203 B1 | 3/2006 |
| EP | 1693974 A1 | 8/2006 |
| EP | 1742388 A1 | 1/2007 |
| EP | 1227605 B1 | 1/2008 |
| EP | 1968250 A1 | 9/2008 |
| EP | 1056226 B1 | 4/2009 |
| EP | 1357683 B1 | 5/2009 |
| GB | 2323252 A | 9/1998 |
| GB | 2399963 A | 9/2004 |
| GB | 2428149 A | 1/2007 |
| JP | 05-260018 | 8/1993 |
| JP | 09-083450 | 3/1997 |
| JP | 09-162810 | 6/1997 |
| JP | 09-200840 | 7/1997 |
| JP | 11-68675 | 3/1999 |
| JP | 2000-152300 | 5/2000 |
| JP | 2000-341744 | 12/2000 |
| JP | 2002-264617 | 9/2002 |
| JP | 2003-148653 | 5/2003 |
| JP | 2003-172827 | 6/2003 |
| JP | 2004-172734 | 6/2004 |
| JP | 2004-245963 | 9/2004 |
| JP | 2004-247090 | 9/2004 |
| JP | 2004-264901 | 9/2004 |
| JP | 2004-265624 | 9/2004 |
| JP | 2004-317737 | 11/2004 |
| JP | 2004-349184 | 12/2004 |
| JP | 2005-018175 | 1/2005 |
| JP | 2005-087135 | 4/2005 |
| JP | 2005-134125 | 5/2005 |
| JP | 2007-228603 | 9/2007 |
| JP | 2008-172597 | 7/2008 |
| WO | 01/78434 A1 | 4/2000 |
| WO | 0042721 A1 | 7/2000 |
| WO | 0184760 A1 | 11/2001 |
| WO | 0221183 A1 | 3/2002 |
| WO | WO 02/30141 A1 * | 4/2002 |
| WO | WO02/30141 A1 | 4/2002 |
| WO | WO02/102102 A1 | 12/2002 |
| WO | 2004/086795 A2 | 3/2003 |
| WO | 2004/086795 A3 | 3/2003 |
| WO | 03024027 A1 | 3/2003 |
| WO | 03/098175 A1 | 11/2003 |
| WO | 2004/030154 A2 | 4/2004 |
| WO | 2004/047472 A1 | 6/2004 |
| WO | 2004059934 A1 | 7/2004 |
| WO | WO2004/056019 A1 | 7/2004 |
| WO | WO2004/056019 A1 | 7/2004 |
| WO | WO2004/093471 A2 | 10/2004 |
| WO | WO 2004/093471 A2 * | 10/2004 |
| WO | 2005/069203 A2 | 7/2005 |
| WO | 2005/069203 A3 | 7/2005 |
| WO | WO2005/062505 A1 | 7/2005 |
| WO | WO2005/073897 A1 | 8/2005 |
| WO | WO2005/079386 A2 | 9/2005 |
| WO | 2005/101701 A2 | 10/2005 |
| WO | 2005/101701 A2 | 10/2005 |
| WO | WO2005/111959 A2 | 11/2005 |
| WO | WO2006/011778 A1 | 2/2006 |
| WO | WO2006/018592 A1 | 2/2006 |
| WO | WO2006/018592 A1 | 2/2006 |
| WO | WO2006/019392 A1 | 2/2006 |
| WO | 2006039941 A1 | 4/2006 |
| WO | 2006046088 A1 | 5/2006 |
| WO | 2006051262 A1 | 5/2006 |
| WO | 2006133609 A1 | 12/2006 |
| WO | WO2006/136811 A1 | 12/2006 |
| WO | 2007048427 A1 | 5/2007 |
| WO | WO2007/077451 A1 | 7/2007 |
| WO | 2007088561 A1 | 8/2007 |
| WO | WO2007/091026 A1 | 8/2007 |
| WO | 2008008249 A2 | 1/2008 |
| WO | WO2008/021442 A2 | 2/2008 |
| WO | 2008027213 A2 | 3/2008 |
| WO | WO2008/033298 A2 | 3/2008 |
| WO | 2008039830 A2 | 4/2008 |

OTHER PUBLICATIONS

Liu, C.P. et al., "Broadband Access Using Wireless-Over-Fibre Technologies," BT Technology Journal, vol. 24, No. 3, Jul. 2006, pp. 130-143.

Moreira, J.D., Alemenar, V., Corral, J.L., Flores, S., Girona, A., Corral, P., "Diversity Techniques for OFDM Based WLAN Systems", pp. 1008-1011, PIMRC 2002 IEEE.

Seto, I., Sekiguchi, T., Matsuoka, H., Tsujimura, A., Sekine, S., Sato, K., Yoshida, H. and Namekata, M., "Antenna-Selective Transmit Diversity Technique for OFDM-based WLANs with Dual-Band Printed Antennas", pp. 51-56 IEEE Communications Society/WCNC 2005.

Winters, J., Salz J., and Gitlin, R., "The Impact of Antenna Diversity on the Capacity of Wireless Communication Systems", IEEE Transactions on Communications, vol. 42, No. 2/3/4, Feb./Mar./Apr. 1994.

Cooper, A.J., "Fiber/Radio" for the Provision of Cordless/Mobile Telephony Services in the Access Network, Electronics Letters, Nov. 22, 1990, vol. 26, No. 24, pp. 2054-2056.

Huang C. and Chiu, C., A WAN-Used Helical Antenna Fully Integrated with PCMCIA Carrier, IEEE Transactions on Antennas and Propagation, vol. 53, No. 12, Dec. 2005.

Bakaul, M., Nirmalathas, A., Lim, C. Novak, D. and Waterhouse, R., Efficient Multiplexing Scheme for Wavelength-Interleaved DWDM Millimeter-Wave Fiber-Radio Systems, IEEE Photonics Technology Letters, vol. 17, No. 12, Dec. 2005.

Patent Cooperation Treaty, International Search Report for International Application No. PCT/US2008/008423, Jul. 6, 2009, 1 page.

International Telecommunication Union, ITU-T G.652, Telecommunication Standardization Sector of ITU, Jun. 2005, Series G: Transmission Systems and Media, Digital Systems and Networks, Transmission media characteristics—Optical fibre cables, Characteristics of a single-mode optical fibre and cable, ITU-T Recommendation G.652, 22 pgs.

International Telecommunication Union, ITU-T G.657, Telecommunication Standardization Sector of ITU, Dec. 2006, Series G: Transmission Systems and Media, Digital Systems and Networks, Transmission media and optical systems characteristics—Optical Fibre Cables, Characteristics of a bending loss insensitive single mode optical fibre and cable for the access network, ITU-T Recommendation G.657, 20 pgs.

Gibson et al., Evanescent Field Analysis of Air-Silica Microstructure Waveguides, IEEE, 0-7803-7105-4/01, 2001, pp. 709-710.

Monro et al., "Holey Fibers with random cladding distributions" Optic Letters, vol. 25, No. 4; Feb. 15, 2000.

Pickrell et al., "Novel Techniques for the Fabrication of Holey Optical Fibers" Spie Conference Proceedings, vol. 4578, pp. 271-282; 2001.

Paulraj, A. et al, "An Overview of MIMO Communications—A Key to Gigabit Wireless," Proceedings of the IEEE, vol. 92, No. 2, Feb. 2004.

Kojucharow, K. et al., "Millimeter-Wave Signal Properties Resulting from Electrooptical Upconversion," IEEE Transaction on Microwave Theory and Techniques, vol. 49, No. 10, Oct. 2001, pp. 1977-1985.

RFID Technology Overview, 11 pages.

Roh, W. and Paulraj. A., "MIMO Channel Capacity for the Distributed Antenna Systems," Vehicular Technology Conference, 2002, proceedings, VTC 2002-Fall, 2002 IEEE 56th, vol. 2, Sep. 24-28, 2002, pp. 706-709.

Niiho, T. et al., "Multi-Channel Wireless LAN Distributed Antenna System Based on Radio-Over-Fiber Techniques," Lasers and Electro-Optics Society 2004, LEOS 2004, The 17th Annual Meeting of the IEEE, vol. 1, Nov. 7-11, 2004, pp. 57-58.

Shen, C., Zhou, S., and Yao, Y., "Comparison of Channel Capacity for MIMO-DAS versus MIMO-CAS," Communications 2003, APCC 2003, The 9th Asia-Pacific Conference, vol. 1, Sep. 21-24, 2003, pp. 113-118.

Wake, D. et al., "Passive Picocell: A New Concept in Wireless Network Infrastructure," Electronics Letters, vol. 33, No. 5, Feb. 27, 1997, pp. 404-406.

* cited by examiner

TRANSPONDER SYSTEMS AND METHODS FOR RADIO-OVER-FIBER (ROF) WIRELESS PICOCELLULAR SYSTEMS

BACKGROUND OF THE INVENTION

1. Field of the Invention

The present invention relates generally to wireless communication systems, and in particular relates to transponders and transponder systems and methods used in optical-fiber-based wireless picocellular systems for radio-over-fiber (RoF) communication.

2. Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (coffee shops, airports, libraries, etc.). Wireless communication systems communicate with wireless devices called "clients," which must reside within the wireless range or "cell coverage area" in order to communicate with the access point device.

One approach to deploying a wireless communication system involves the use of "picocells," which are radio-frequency (RF) coverage areas having a radius in the range from about a few meters up to about 20 meters. Because a picocell covers a small area, there are typically only a few users (clients) per picocell. Picocells also allow for selective wireless coverage in small regions that otherwise would have poor signal strength when covered by larger cells created by conventional base stations.

In conventional wireless systems, picocells are created by and centered on a wireless access point device connected to a head-end controller. The wireless access point device includes digital information processing electronics, a RF transmitter/receiver, and an antenna operably connected to the RF transmitter/receiver. The size of a given picocell is determined by the amount of RF power transmitted by the access point device, the receiver sensitivity, antenna gain, and the RF environment, as well as by the RF transmitter/receiver sensitivity of the wireless client device. Client devices usually have a fixed RF receiver sensitivity, so that the above-mentioned properties of the access point device mainly determine the picocell size. Combining a number of access point devices connected to the head-end controller creates an array of picocells that cover an area called a "picocellular coverage area." A closely packed picocellular array provides high per-user data-throughput over the picocellular coverage area.

Prior art wireless systems and networks are wire-based signal distribution systems where the access point devices are treated as separate processing units linked to a central location. This makes the wireless system/network relatively complex and difficult to scale, particularly when many picocells need to cover a large region. Further, the digital information processing performed at the access point devices requires that these devices be activated and controlled by the head-end controller, which further complicates the distribution and use of numerous access point devices to produce a large picocellular coverage area.

While RoF wireless picocellular systems are generally robust, there are some limitations. One limitation relates to the radiation pattern from the transponder antenna. Though microstrip antennas have a directional radiation pattern, they are generally more expensive and more complicated to integrate into a RoF cable than the simpler and less expensive dipole antennas. However, dipole antennas in the form of wires radiate omnidirectionally in a plane perpendicular to the RoF cable. This wastes energy and also interferes with other picocells, such as those formed in the floor above the ceiling in which the RoF cable is deployed.

Another limitation relates to the need for having a transponder for each picocell. The typical RoF transponder includes a mechanical housing, a laser, a photodetector, a printed circuit board with RF electronics, optical connectors, and electrical connectors. The relatively small size of picocells typically requires that the transponders be spaced apart by between 5 to 10 meters or so. A RoF wireless picocellular system would be easier to deploy and be less expensive if the number of transponders could be reduced.

A further limitation relates to locating RoF transponders after they are deployed. The typical RoF wireless picocellular system includes one or more RoF cables that are hidden in a building's infrastructure, such as above a suspended ceiling. This makes it difficult for service personnel to locate a problematic transponder.

Another limitation relates to deploying the RoF transponders. One way of deploying transponders is to tether them to respective access points in the RoF cable using a tether cable. However, the position of each transponder relative to the RoF cable tends to be different, requiring different lengths of tether cable. This requires that the slack in some of the tether cables be addressed by coiling the tether or otherwise storing the excess tether cable. In addition, tether cabling needs to be packaged for shipping in a manner that lends itself to ease of installation since quicker system installation translates into cost savings.

SUMMARY OF THE INVENTION

One aspect of the invention is a transponder system with enhanced antenna directivity, for use in a RoF wireless picocellular system. The system includes a transponder having a converter pair unit adapted to convert radio-frequency (RF) electrical signals into optical signals and vice versa, and an antenna system having at least one antenna element operably coupled to the converter pair unit. The system also includes at least one radiation-reflecting member arranged relative to the at least one antenna element so as to provide enhanced antenna directivity as compared to not having the at least one radiation-reflecting member.

Another aspect of the invention is a transponder node assembly for a RoF wireless picocellular system. The system includes two or more converter pairs, with each converter pair adapted to convert RF electrical signals into RF optical signals and vice versa. The system also includes corresponding two or more antenna systems electrically connected to the corresponding two or more converter pairs. The system also includes a protective housing that houses the two or more converter pairs.

Another aspect of the invention is a transponder radio-frequency identification (RFID) system that includes a radio-over-fiber (RoF) transponder adapted to convert radio-frequency (RF) electrical signals to RF optical signals and vice versa. The system also includes a RFID tag positioned relative to the transponder and adapted to produce a RFID-tag signal. In one case, the RFID-tag signal contains RFID tag data that includes at least one property of the transponder. In another case, the RFID-tag signal contains no RFID tag data and acts as a ping signal to locate the RFID tag. The system also includes a RFID tag reader adapted to cause the RFID tag to emit the RFID-tag signal and to detect and process the RFID tag signal.

Another aspect of the invention is a tether cable assembly for a RoF wireless picocellular system having an optical fiber cable. The assembly includes a tether cable having at least one optical fiber, at least one electrical wire, and proximal and distal ends. The assembly also includes a spool around which the tether cable can be coiled and uncoiled. The assembly further includes a housing surrounding the spool and having a first slot sized to pass the tether cable. The assembly also has a RoF transponder connected to the tether cable proximate end. The tether cable distal end is adapted to operably couple to the optical fiber cable.

Additional features and advantages of the invention are set forth in the detailed description that follows, and will be readily apparent to those skilled in the art from that description or recognized by practicing the invention as described herein, including the detailed description that follows, the claims, and the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

Accordingly, various basic electronic circuit elements and signal-conditioning components, such as bias tees, RF filters, amplifiers, power dividers, etc., are not all shown in the drawings for ease of explanation and illustration. The application of such basic electronic circuit elements and components to the systems of the present invention will be apparent to one skilled in the art.

DETAILED DESCRIPTION OF THE PREFERRED EMBODIMENTS

Reference is now made in detail to the present preferred embodiments of the invention, examples of which are illustrated in the accompanying drawings. Whenever possible, the same or analogous reference numbers are used throughout the drawings to refer to the same or like parts.

Generalized Optical-Fiber-Based RoF Wireless Picocellular System

Figure 1:
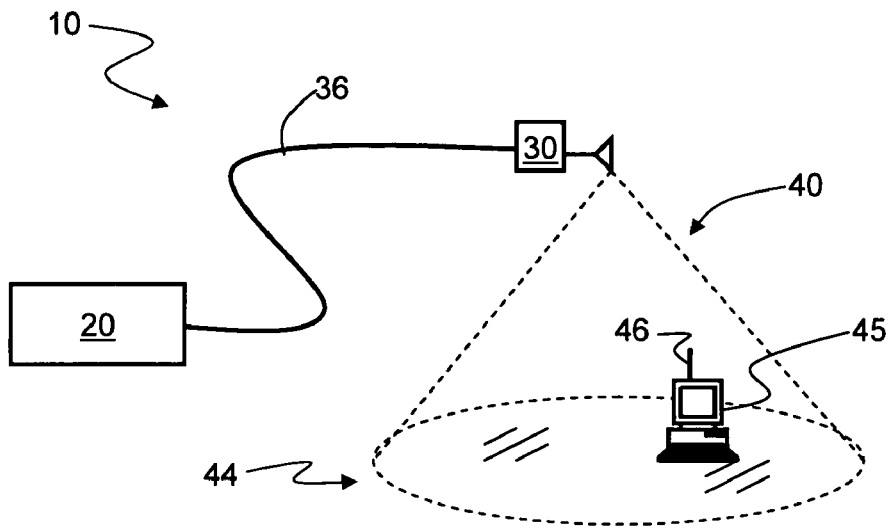
FIG. 1 is a schematic diagram of a generalized embodiment of an optical-fiber-based wireless picocellular system showing a head-end unit optically coupled to a transponder via an optical fiber RF communication link, along with the picocell formed by the transponder and a client device within the picocell.

FIG. 1 is a schematic diagram of a generalized embodiment of an optical-fiber-based RoF wireless picocellular system 10 according to the present invention. System 10 includes a head-end unit 20, one or more transponder units ("transponder") 30 and an optical fiber RF communication link 36 that optically couples the head-end unit to the transponder. In an example embodiment, optical fiber RF communication link 36 includes at least one optical fiber, and preferably two optical fibers (e.g., uplink and downlink optical fibers, as discussed below). As discussed in detail below, system 10 is adapted to form a picocell 40 substantially centered about transponder 30. The one or more transponders 30 form a picocellular coverage area 44. Head-end unit 20 is adapted to perform or to facilitate any one of a number of RF-over-fiber applications, such as radio-frequency identification (RFID), wireless local-area network (WLAN) communication, or cellular phone service. Shown within picocell 40 is a client device 45 in the form of a computer. Client device 45 includes an antenna 46 (e.g., a wireless card) adapted to receive and/or send electromagnetic RF signals.

Figure 2:
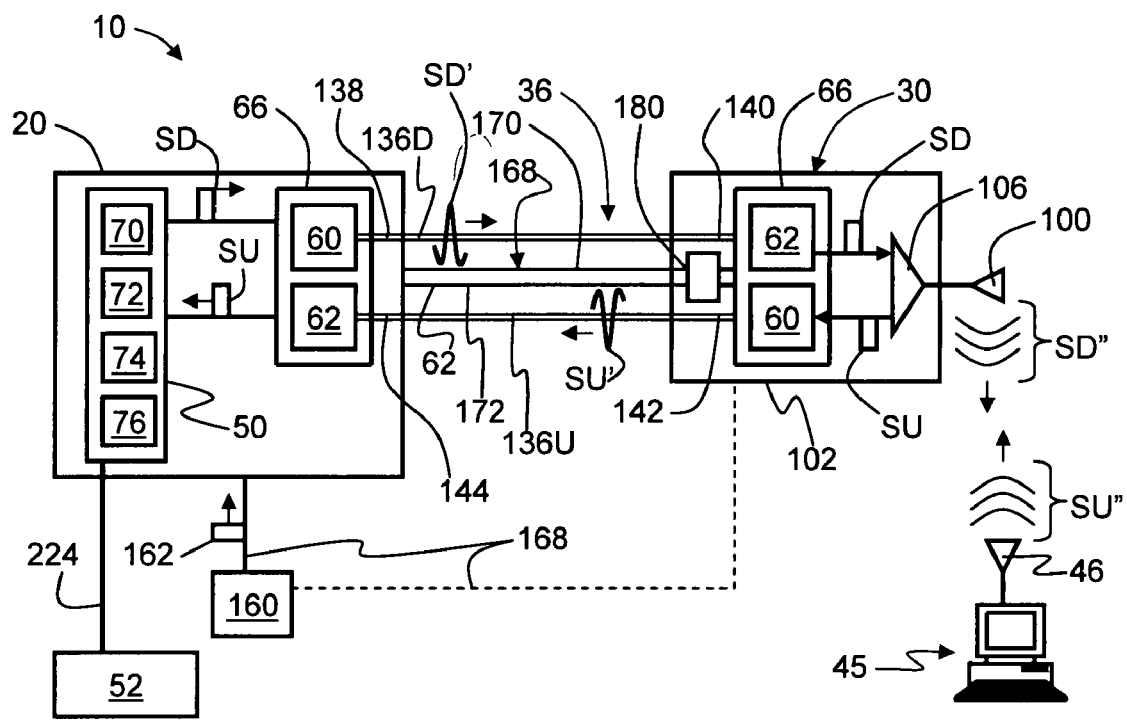
FIG. 2 is a detailed schematic diagram of an example embodiment of the system of FIG. 1, showing the details of the head-end unit, the optical fiber RF communication link and the transponder.

FIG. 2 is a detailed schematic diagram of an example embodiment of system 10 of FIG. 1. In an example embodiment, head-end unit 20 includes a service unit 50 that provides electrical RF service signals for a particular wireless service or application. In an example embodiment, service unit 50 provides electrical RF service signals by passing (or conditioning and then passing) such signals from one or more outside networks 52, as described below. In a particular example embodiment, this includes providing WLAN signal distribution as specified in the IEEE 802.11 standard, i.e., in the frequency range from 2.4 to 2.5 GHz and from 5.0 to 6.0 GHz. In another example embodiment, service unit 50 provides electrical RF service signals by generating the signals directly. In another example embodiment, service unit 50 coordinates the delivery of the electrical RF service signals between client devices within picocellular coverage area 44.

Service unit 50 is electrically coupled to an electrical-to-optical (E/O) converter 60 that receives an electrical RF service signal from the service unit and converts it to corresponding optical signal. In an example embodiment, E/O converter 60 includes a laser suitable for delivering sufficient dynamic range for the RF-over-fiber applications of the present invention, and optionally includes a laser driver/amplifier electrically coupled to the laser. Examples of suitable lasers for E/O converter 60 include laser diodes, distributed feedback (DFB) lasers, Fabry-Perot (FP) lasers, and vertical cavity surface emitting lasers (VCSELs).

Head-end unit 20 also includes an optical-to-electrical (O/E) converter 62 electrically coupled to service unit 50. O/E converter 62 receives an optical RF service signal and converts it to a corresponding electrical signal. In an example embodiment, O/E converter is a photodetector, or a photodetector electrically coupled to a linear amplifier. E/O converter 60 and O/E converter 62 constitute a "converter pair unit" 66.

In an example embodiment, service unit 50 includes a RF signal modulator/demodulator unit 70 that generates an RF carrier of a given frequency and then modulates RF signals onto the carrier, and that also demodulates received RF signals. Service unit 50 also includes a digital signal processing unit ("digital signal processor") 72, a central processing unit (CPU) 74 for processing data and otherwise performing logic and computing operations, and a memory unit 76 for storing data, such as RFID tag information or data to be transmitted over the WLAN. In an example embodiment, the different frequencies associated with the different signal channels are created by modulator/demodulator unit 70 generating different RF carrier frequencies based on instructions from CPU 74. Also, as described below, the common frequencies associated with a particular combined picocell are created by modulator/demodulator unit 70 generating the same RF carrier frequency.

With continuing reference to FIG. 2, in an example embodiment transponder 30 includes a converter pair 66, wherein the E/O converter 60 and the O/E converter 62 therein are electrically coupled to an antenna system 100 via a RF signal-directing element 106, such as a circulator. Signal-directing element 106 serves to direct the downlink and uplink electrical RF service signals, as discussed below. In an example embodiment, antenna system 100 includes one or more patch antennas, such as disclosed in U.S. patent application Ser. No. 11/504,999 filed Aug. 16, 2006, which is assigned to the present assignee and which patent application is incorporated herein by reference. Transponder 30 also includes a housing 102 that in an example embodiment houses some or all of the various transponder elements. In an example embodiment, some or all of antenna system 100 lies outside of housing 102. In an example embodiment, housing 102 houses only the elements making up converter pair unit 66.

Figure 3:
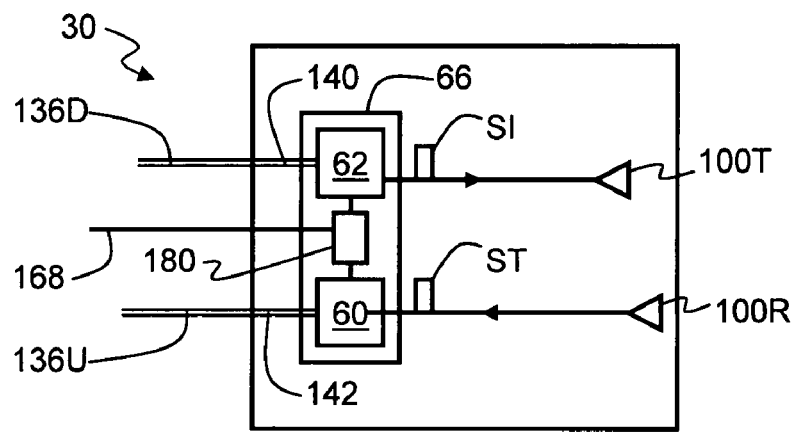
FIG. 3 is a close-up view of an alternative example embodiment for the transponder of the wireless system of FIG. 2, wherein the transponder includes a transmitting antenna and a receiving antenna within the transponder housing, and the converter pair unit includes the DC power converter.

FIG. 3 is a close-up view of an alternative example embodiment for transponder 30 that includes two antennae: a transmitting antenna 100T electrically coupled to O/E converter 62, and a receiving antenna 100R electrically coupled to O/E converter 60. The two-antenna embodiment obviates the need for RF signal-directing element 106. Note also that the example embodiment of transponder 30 in FIG. 3 includes DC power converter 180 within converter pair unit 66, and that antenna system 100 is within housing 102.

Transponders 30 of the present invention differ from the typical access point device associated with wireless communication systems in that the preferred embodiment of the transponder has just a few signal-conditioning elements and no digital information processing capability. Rather, the information processing capability is located remotely in head-end unit 20, and in a particular example, in service unit 50. This allows transponder 30 to be very compact and virtually maintenance free. In addition, the preferred example embodiment of transponder 30 consumes very little power, is transparent to RF signals, and does not require a local power source, as described below.

With reference again to FIG. 2, an example embodiment of optical fiber RF communication link 36 includes a downlink optical fiber 136D having an input end 138 and an output end 140, and an uplink optical fiber 136U having an input end 142 and an output end 144. The downlink and uplink optical fibers 136D and 136U optically couple converter pair 66 at head-end unit 20 to the converter pair at transponder 30. Specifically, downlink optical fiber input end 138 is optically coupled to E/O converter 60 of head-end unit 20, while output end 140 is optically coupled to O/E converter 62 at transponder 30. Similarly, uplink optical fiber input end 142 is optically coupled to E/O converter 60 of transponder 30, while output end 144 is optically coupled to O/E converter 62 at head-end unit 20.

In an example embodiment, the optical-fiber-based wireless picocellular system 10 of the present invention employs a known telecommunications wavelength, such as 850 nm, 1300 nm, or 1550 nm. In another example embodiment, system 10 employs other less common but suitable wavelengths such as 980 nm.

Example embodiments of system 10 include either single-mode optical fiber or multimode optical fiber for downlink and uplink optical fibers 136D and 136U. The particular type of optical fiber depends on the application of system 10. For many in-building deployment applications, maximum transmission distances typically do not exceed 300 meters. The maximum length for the intended RF-over-fiber transmission needs to be taken into account when considering using multi-mode optical fibers for downlink and uplink optical fibers 136D and 136U. For example, it has been shown that a 1400 MHz·km multi-mode fiber bandwidth-distance product is sufficient for 5.2 GHz transmission up to 300 m.

In an example embodiment, the present invention employs 50 μm multi-mode optical fiber for the downlink and uplink optical fibers 136D and 136U, and E/O converters 60 that operate at 850 nm using commercially available VCSELs specified for 10 Gb/s data transmission. In a more specific example embodiment, OM3 50 μm multi-mode optical fiber is used for the downlink and uplink optical fibers 136D and 136U.

Wireless system 10 also includes a power supply 160 that generates an electrical power signal 162. Power supply 160 is electrically coupled to head-end unit 20 for powering the power-consuming elements therein. In an example embodiment, an electrical power line 168 runs through the head-end unit and over to transponder 30 to power E/O converter 60 and O/E converter 62 in converter pair 66, the optional RF signal-directing element 106 (unless element 106 is a passive device such as a circulator), and any other power-consuming elements (not shown). In an example embodiment, electrical power line 168 includes two wires 170 and 172 that carry a single voltage and that are electrically coupled to a DC power converter 180 at transponder 30. DC power converter 180 is electrically coupled to E/O converter 60 and O/E converter 62, and changes the voltage or levels of electrical power signal 162 to the power level(s) required by the power-consuming components in transponder 30. In an example embodiment, DC power converter 180 is either a DC/DC power converter, or an AC/DC power converter, depending on the type of power signal 162 carried by electrical power line 168. In an example embodiment, electrical power line 168 includes standard electrical-power-carrying electrical wire(s), e.g., 18-26 AWG (American Wire Gauge) used in standard telecommunications and other applications. In another example embodiment, electrical power line 168 (dashed line) runs directly from power supply 160 to transponder 30 rather than from or through head-end unit 20. In another example embodiment, electrical power line 168 includes more than two wires and carries multiple voltages.

In an example embodiment, head-end unit 20 is operably coupled to an outside network 52 via a network link 224.

General Method of Operation

With reference to the optical-fiber-based wireless picocellular system 10 of FIG. 1 and FIG. 2, service unit 50 generates an electrical downlink RF service signal SD ("electrical signal SD") corresponding to its particular application. In an example embodiment, this is accomplished by digital signal processor 72 providing the RF signal modulator 70 with an electrical signal (not shown) that is modulated onto a RF carrier to generate a desired electrical signal SD.

Electrical signal SD is received by E/O converter 60, which converts this electrical signal into a corresponding optical downlink RF signal SD' ("optical signal SD'"), which is then coupled into downlink optical fiber 136D at input end 138. It is noted here that in an example embodiment optical signal SD' is tailored to have a given modulation index. Further, in an example embodiment the modulation power of E/O converter 60 is controlled (e.g., by one or more gain-control amplifiers, not shown) to vary the transmission power from antenna system 100. In an example embodiment, the amount of power provided to antenna system 100 is varied to define the size of the associated picocell 40, which in example embodiments range anywhere from about a meter across to about twenty meters across.

Optical signal SD' travels over downlink optical fiber 136 to output end 140, where it is received by O/E converter 62 in transponder 30. O/E converter 62 converts optical signal SD' back into electrical signal SD, which then travels to signal-directing element 106. Signal-directing element 106 then directs electrical signal SD to antenna 100. Electrical signal SD is fed to antenna system 100, causing it to radiate a corresponding electromagnetic downlink RF signal SD" ("electromagnetic signal SD" ").

Because client device 45 is within picocell 40, electromagnetic signal SD" is received by client device antenna 46, which may be part of a wireless card, or a cell phone antenna, for example. Antenna 46 converts electromagnetic signal SD" into electrical signal SD in the client device (signal SD is not shown therein). Client device 45 then processes electrical signal SD, e.g., stores the signal information in memory, displays the information as an e-mail or text message, etc.

In an example embodiment, client device 45 generates an electrical uplink RF signal SU (not shown in the client device), which is converted into an electromagnetic uplink RF signal SU" ("electromagnetic signal SU" ") by antenna 46.

Because client device 45 is located within picocell 40, electromagnetic signal SU" is detected by transponder antenna system 100, which converts this signal back into electrical signal SU. Electrical signal SU is directed by signal-directing element 106 to E/O converter 60, which converts this electrical signal into a corresponding optical uplink RF signal SU' ("optical signal SU' "), which is then coupled into input end 142 of uplink optical fiber 136U. Optical signal SU' travels over uplink optical fiber 136U to output end 144, where it is received by O/E converter 62 at head-end unit 20. O/E converter 62 converts optical signal SU' back into electrical signal SU, which is then directed to service unit 50. Service unit 50 receives and processes signal SU, which in an example embodiment includes one or more of the following: storing the signal information; digitally processing or conditioning the signals; sending the signals on to one or more outside networks 52 via network links 224; and sending the signals to one or more client devices 45 in picocellular coverage area 44. In an example embodiment, the processing of signal SU includes demodulating this electrical signal in RF signal modulator/demodulator unit 70, and then processing the demodulated signal in digital signal processor 72.

System with Central Head-End Station and Optical Fiber Cable

Figure 4:
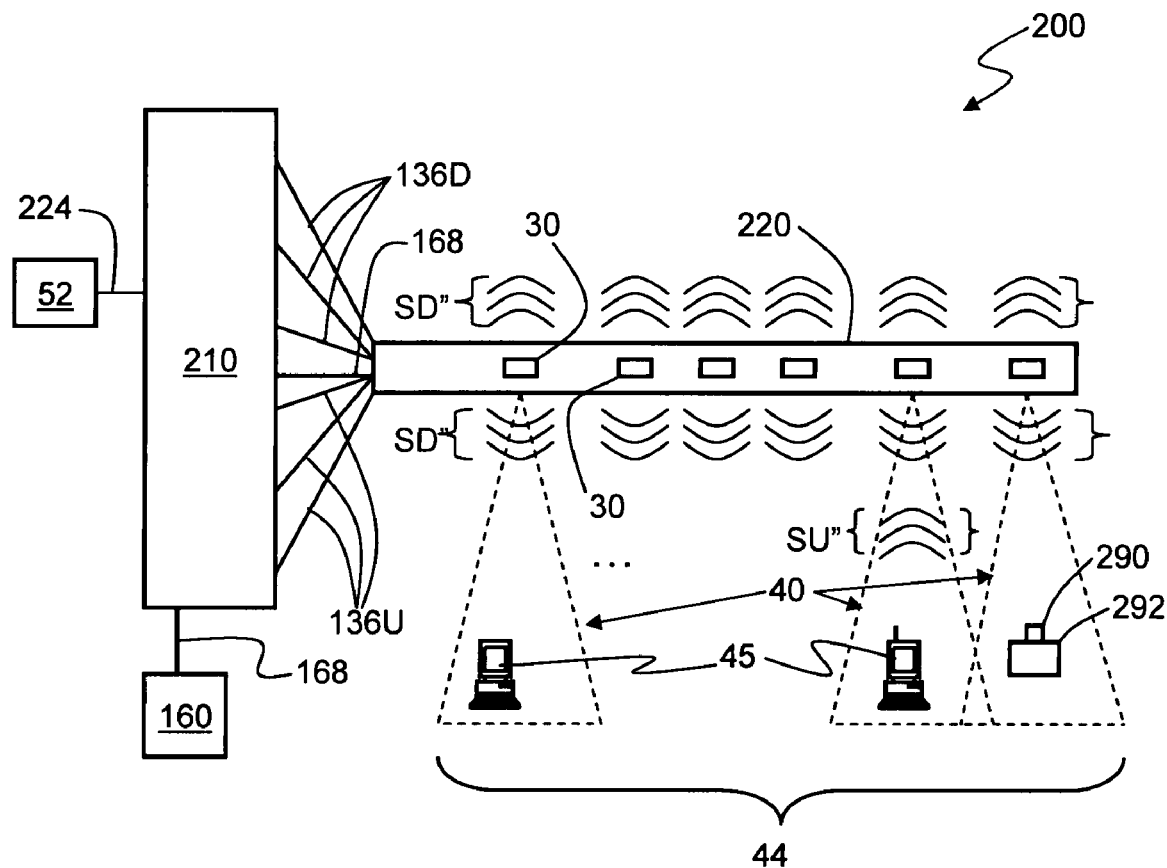
FIG. 4 is a schematic diagram of an example embodiment of an optical-fiber-based wireless picocellular system according to the present invention that utilizes a central head-end station and multiple transponders arranged along an optical fiber cable.

FIG. 4 is a schematic diagram of an example embodiment of an optical-fiber-based wireless picocellular system 200 that includes a central head-end station 210. Central head-end station 210 can be thought of as a head-end unit 20 adapted to handle one or more service units 50 and one or more transponders 30. Central head-end station 210 is optically coupled to an optical fiber cable 220 that includes multiple transponders 30. Optical fiber cable 220 is constituted by multiple optical fiber RF communication links 36, with each link optically coupled to a corresponding transponder 30. In an example embodiment, multiple transponders 30 are spaced apart along the length of optical fiber cable 220 (e.g., at 8 meter intervals) to create a desired picocell coverage area 44 made up of picocells 40, which in practice overlap at the edges.

Figure 5:
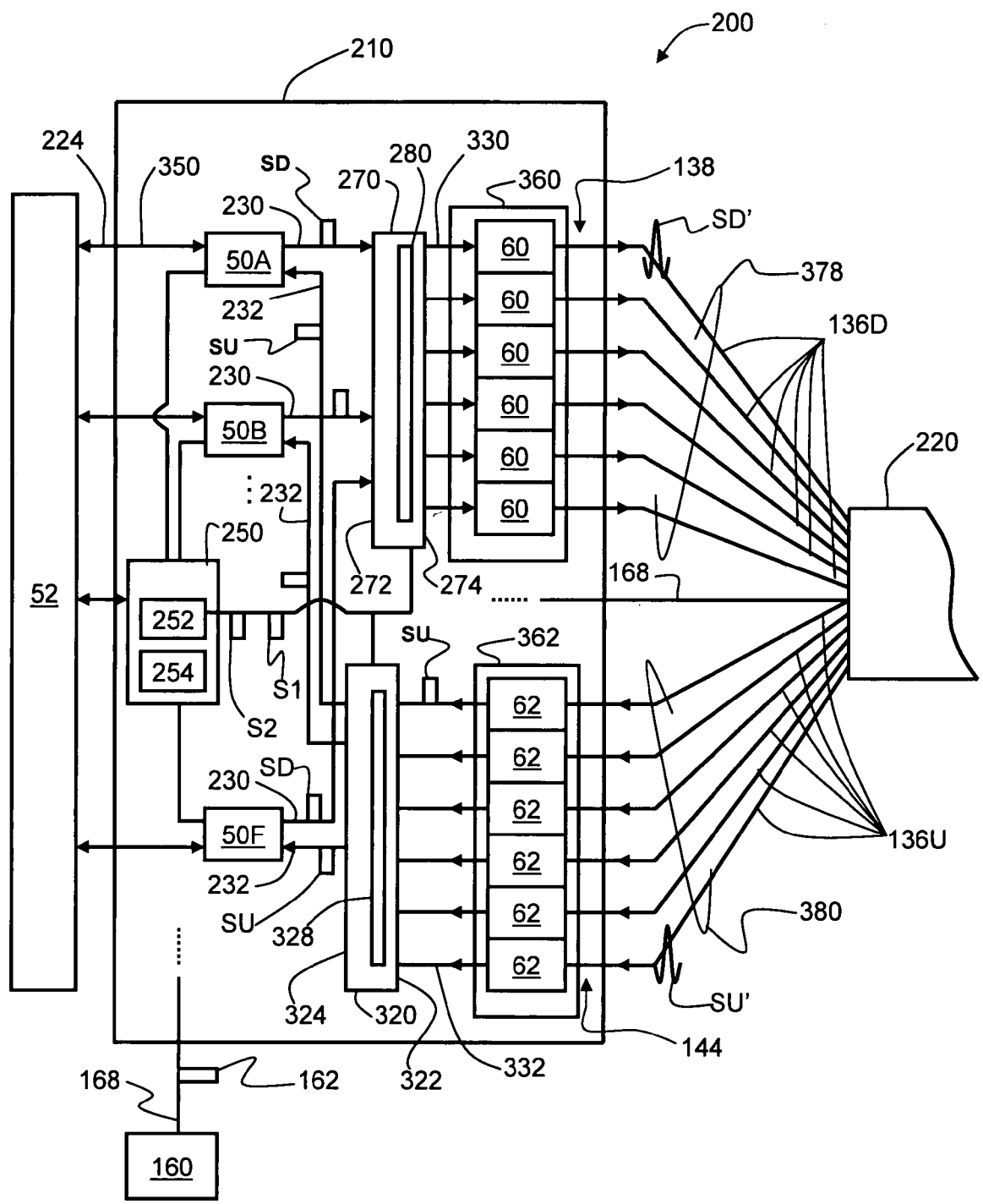
FIG. 5 is a detailed schematic diagram of an example embodiment of the central head-end station of the system of FIG. 4.

FIG. 5 is a detailed schematic diagram of an example embodiment of central head-end control station 210. Rather than including multiple head-end units 20 of FIG. 1 directly into head-end control station 210, in an example embodiment the head-end units are modified to allow for each service unit 50 to communicate with one, some, or all of transponders 30, depending on the particular application of a given service unit. Service units 50 are each electrically coupled to a RF transmission line 230 and a RF receiving line 232. In FIG. 5, three of six service units 50A through 50F are shown for the sake of illustration.

In an example embodiment, system 200 further includes a main controller 250 operably coupled to service units 50 and adapted to control and coordinate the operation of the service units in communicating with transponders 30. In an example embodiment, controller 250 includes a central processing unit (CPU) 252 and a memory unit 254 for storing data. CPU 252 is adapted (e.g., is programmed) to process information provided to controller 250 by one or more of service units 50. In an example embodiment, controller 250 is or includes a programmable computer adapted to carry out instructions (programs) provided to it or otherwise encoded therein on a computer-readable medium.

Central head-end station 210 further includes a downlink RF signal multiplexer ("downlink multiplexer") 270 operably coupled to controller 250. Downlink multiplexer unit 270 has an input side 272 and an output side 274. Transmission lines 230 are electrically connected to downlink multiplexer 270 at input side 272.

In an example embodiment, downlink multiplexer 270 includes a RF signal-directing element 280 (e.g., a RF switch) that allows for selective communication between service units 50 and transponders 30, as described below. In an example, the selective communication involves sequentially addressing transponders 30 for polling corresponding picocells 40. Such sequential polling can be used, for example, when one of service units 50 is a RFID reader searching for RFID tags 290 in picocells 40 (FIG. 4). In an example embodiment, RFID tags 290 are attached to an item 292 to be tracked or otherwise monitored via the attached RFID tag. In another example embodiment, the selective communication involves simultaneously addressing some or all of transponders 30. Such simultaneous addressing can be used, for example, when one of service units 50 is a cellular phone transmitter or a RF-signal feed-through unit that provides simultaneous coverage of some or all of picocells 40.

Central head-end station 210 also includes an uplink RF signal multiplexer ("uplink multiplexer") 320 operably coupled to controller 250 and having an input side 322 and an output side 324. Receiving lines 232 are electrically connected to uplink multiplexer 320 at output side 324. In an example embodiment, uplink multiplexer 320 includes a RF signal-directing element 328.

Central head-end station 210 also includes a number of E/O converters 60 that make up an E/O converter array 360, and a corresponding number of O/E converters 62 that make up an O/E converter array 362. E/O converters 60 are electrically coupled to output side 274 of downlink multiplexer 270 via electrical lines 330, and are optically coupled to input ends 138 of corresponding downlink optical fibers 136D. O/E converters 62 are electrically coupled to input side 322 of uplink multiplexer 320 via electrical lines 332, and are optically coupled to output ends 144 of corresponding uplink optical fiber 136U. Downlink optical fibers 136D constitute a downlink optical fiber cable 378 and uplink optical fibers 136U constitute an uplink optical fiber cable 380.

Figure 6A:
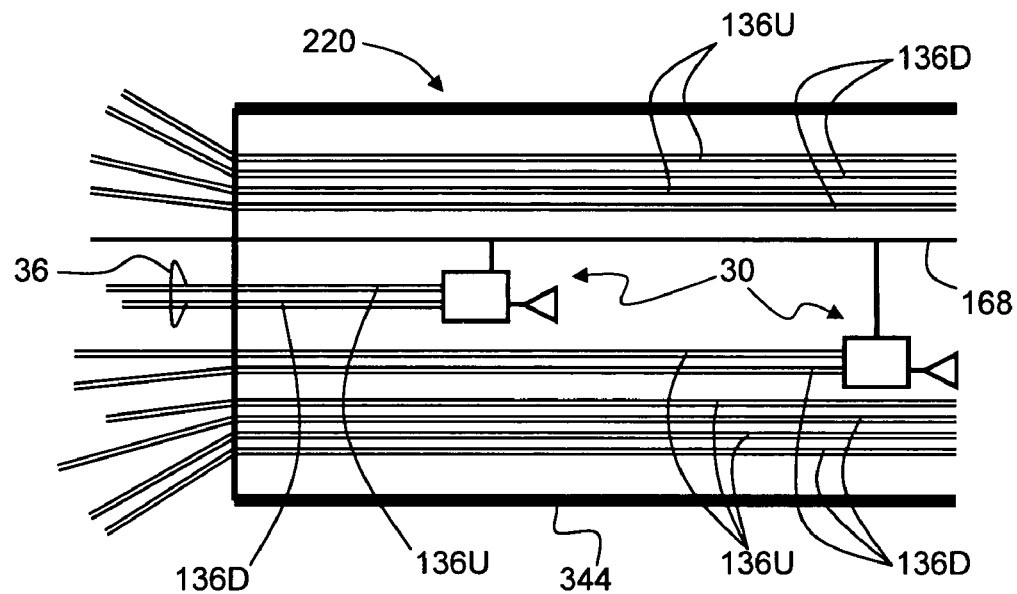
FIG. 6A is a close-up cut-away view of the optical fiber cable of the system of FIG. 4, showing two transponders, the downlink and uplink optical fibers, and the electrical power line that powers the transponders.

FIG. 6A is a close-up schematic diagram of optical fiber cable 220 showing downlink and uplink optical fibers 136D and 136U and two of the six transponders 30. Also shown is electrical power line 168 electrically coupled to transponders 30. In an example embodiment, optical fiber cable 220 includes a protective outer jacket 344. In an example embodiment, transponders 30 reside completely within out jacket 344.

Figure 6B:
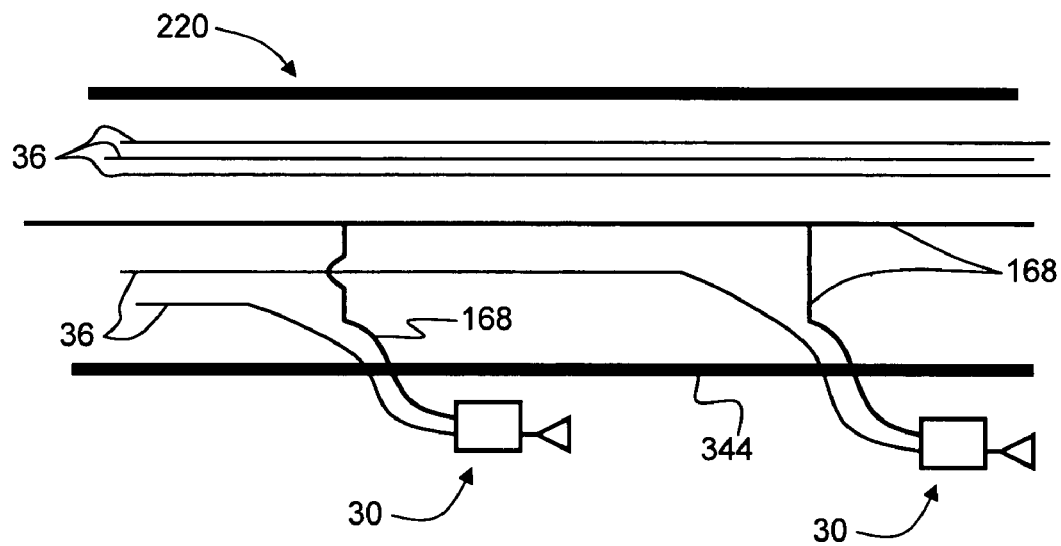
FIG. 6B is a schematic diagram similar to FIG. 6, illustrating an example embodiment wherein transponders lie outside of the protective outer jacket of the optical fiber cable.

FIG. 6B is a schematic diagram similar to FIG. 6A, illustrating an example embodiment wherein transponders 30 lie outside of protective outer jacket 344. Having transponders 30 lie outside of protective outer jacket 344 makes it easier to arrange the transponders relative to a building infrastructure after the optical fiber cable is deployed, as described below.

Method of Operation

With reference to FIGS. 4, 5, 6A and 6B, optical-fiber-based wireless picocellular system 200 operates as follows. At central head-end station 210, service units 50A, 50B, . . . 50F each generate or pass through from one or more outside networks 52 respective electrical signals SD that correspond to the particular application of the given service unit. Electrical signals SD are transmitted over RF transmission lines 230 to downlink multiplexer 270. Downlink multiplexer 270 then combines (in frequency) and distributes the various signals SD to E/O converters 60 in E/O converter array 360. In an example embodiment, downlink multiplexer 270 and RF signal-directing element 280 therein are controlled by controller 250 via a control signal S1 to direct signals SD to one, some or all of E/O converters 60 in E/O converter array 360 and thus to one, some or all of transponders 30, based on the particular service unit application. For example, if service unit 50A is a cellular phone unit, then in an example embodiment signals SD therefrom (e.g., passing therethrough from one or more outside networks 52) are divided (and optionally amplified) equally by RF signal-directing element 280 and provided to each E/O converter 60 in E/O converter array 360. This results in each transponder 30 being addressed. On the other hand, if service unit 50F is a WLAN service unit, then RF signal-directing element 280 may be adapted (e.g., programmed) to direct signals SD to select ones of E/O converters 60 in E/O converter array 360 so that only select transponders 30 are addressed.

Thus, one, some or all of E/O converters 60 in E/O converter array 360 receive electrical signals SD from downlink multiplexer 270. The addressed E/O converters 60 in E/O converter array 360 convert electrical signals SD into corresponding optical signals SD', which are transmitted over the corresponding downlink optical fibers 136D to the corresponding transponders 30. The addressed transponders 30 convert optical signals SD' back into electrical signals SD, which are then converted into electromagnetic signals SD" that correspond to the particular service unit application.

Figure 7:
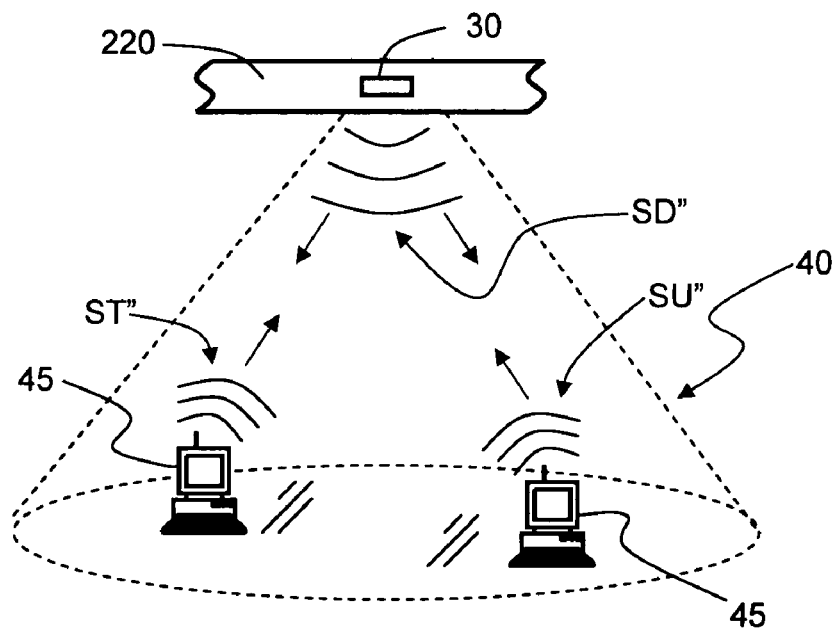
FIG. 7 is schematic diagram illustrating a transponder in the optical fiber cable along with the corresponding picocell, and showing the exchange of electromagnetic RF service signals (downlink and uplink signals) between the transponder and client devices within the picocell.

FIG. 7 is a close-up view of one of transponders 30 in optical fiber cable 220, illustrating the corresponding picocell 40 and the exchange of downlink and uplink electromagnetic signals SD" and SU" between the transponder and client devices 45 within the picocell. In particular, electromagnetic signals SU" are received by the corresponding transponder 30 and converted to electrical signals SU, and then to optical signals SD'. Optical signals SD' then travel over uplink optical fiber 136U and are received by O/E converter array 362 and the corresponding O/E converters 62 therein for the addressed transponders 30. The O/E converters 60 convert optical signals SU' back to electrical signals SU, which then proceed to uplink multiplexer 320. Uplink multiplexer 320 then distributes electrical signals SU to the service unit(s) 50 that require(s) receiving these electrical signals. The receiving service units 50 process signals SU, which in an example embodiment includes one or more of: storing the signal information; digitally processing or conditioning the signals; sending the signals on to one or more outside networks 52 via network links 224; and sending the signals to one or more client devices 45 in picocellular coverage area 44.

In an example embodiment, uplink multiplexer 320 and RF signal-directing element 328 therein are controlled by controller 250 via a control signal S2 to direct electrical signals SU to the service unit(s) 50 that require(s) receiving electrical signals SU.

In an example embodiment, the different services from some or all of service units 50 (i.e. cellular phone service, WiFi for data communication, RFID monitoring, etc.) are combined at the RF signal level by frequency multiplexing.

In an example embodiment, a single electrical power line 168 from power supply 160 at central control station 210 is incorporated into optical fiber cable 220 and is adapted to power each transponder 30, as shown in FIG. 6. Each transponder 30 taps off the needed amount of power, e.g., via DC converter 180 (FIG. 2). Since the preferred embodiment of transponder 30 has relatively low functionality and power consumption, only relatively low electrical power levels are required (e.g., ~1 watt), allowing high-gauge wires to be used (e.g., 20 AWG or higher) for electrical power line 168. In an example embodiment that uses many transponders 30 (e.g., more than 12) in optical fiber cable 220, or if the power consumption for transponders 30 is significantly larger than 1 watt due to their particular design, lower-gauge wires or multiple wires are employed in electrical power line 168. The inevitable voltage drop along electrical power line 168 within cable 220 typically requires large-range (~30 volts) voltage regulation at each transponder 30. In an example embodiment, DC power converters 180 at each transponder 30 perform this voltage regulation function. If the expected voltage drop is known, then in an example embodiment controller 250 carries out the voltage regulation. In an alternative embodiment, remote voltage sensing at each transponder 30 is used, but this approach is not the preferred one because it adds complexity to the system.

Transponder System with Enhanced Antenna Directivity

Figure 8:
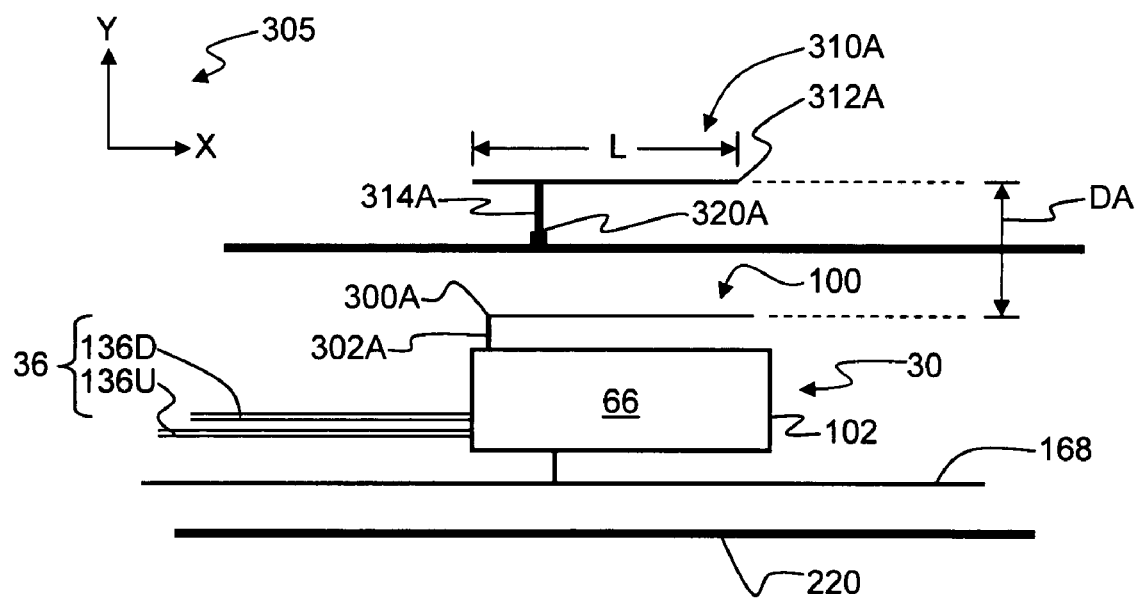
FIG. 8 is a close-up schematic diagram of a section of optical fiber cable and a transponder incorporated therein, illustrating an example embodiment of the present invention wherein the transponder includes a single dipole antenna element and a radiation-reflector assembly arranged on the optical fiber cable relative to the single dipole antenna.

FIG. 8 is a close-up schematic diagram of a section of optical fiber cable 220 and transponder 30 therein, illustrating an example embodiment of the present invention wherein the transponder includes an antenna system 100 having a single dipole antenna element 300A connected to converter pair unit 66 via a section of coaxial cable 302A. FIG. 8 includes X-Y coordinates 305 for the sake of reference for the discussion below, wherein the X-direction is horizontal and the Y-direction is vertical. Also shown in FIG. 8 is a radiation-reflector assembly 310A that includes a radiation-reflecting member 312A supported by a support member 314A. In an example embodiment, radiation-reflecting member 312A is movable, e.g., adjustable via rotation about its long and/or short axes. Transponder 30 and radiation-reflecting member 312A (or alternatively, the entire radiation-reflector assembly 310A) make up a "transponder system."

Radiation-reflector assembly 310A is shown mounted atop optical fiber cable 220 so as to be above and parallel to antenna element 300A, with support member 314A engaged with a mounting member 320A fixed to optical fiber cable 220. The distance between antenna element 300A and radiation reflecting member 312A is DA. In general, radiation-reflecting member 312A is arranged relative to antenna element 300A so as to provide enhanced antenna directivity as compared to not having the radiation-reflecting member so arranged.

In an example embodiment, distance DA is equal to or is about $\lambda_{RA}/4$, where $\lambda_{RA}$ is the center wavelength of the operating band of antenna element 300A and thus the downlink and uplink electromagnetic radiation signals SD" and SU" transmitted therefrom and received thereby. This allows the reflected signals to be in phase with the non-reflected signals by accumulating a total phase of $\lambda_{RA}/2$ by traveling to and from radiation-reflecting member 312A as well as another phase accumulation of $\lambda_{RA}/2$ upon reflection.

In an example embodiment, radiation-reflecting member 312A is made of metal, such as copper. Also in an example embodiment, support member 314A is made of a dielectric material such as plastic, and is adapted to snap-engage mounting member 320A.

Figure 9:
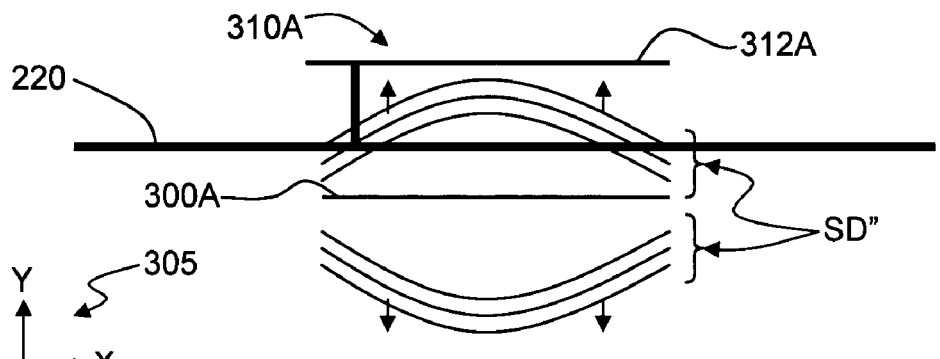
FIG. 9 and FIG. 10 are close-up schematic diagrams of the antenna element and radiation-reflector assembly of FIG. 8, illustrating how an upward-traveling downlink electromagnetic signal is reflected by the radiation-reflector assembly.
Figure 10:
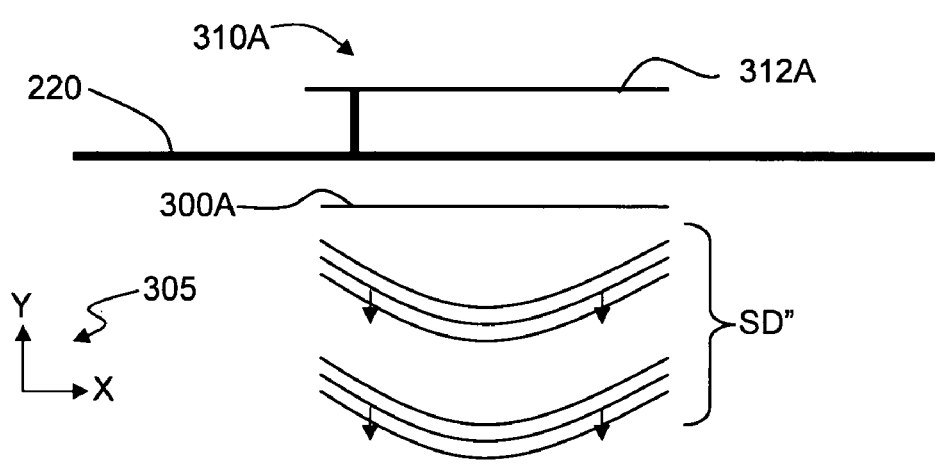

In operation, electromagnetic downlink signals SD" are emitted from antenna element 300A in both the +Y and −Y directions, as illustrated in the close-up schematic diagram of FIG. 9. The electromagnetic signals SD" that propagate in the +Y direction encounter radiation-reflecting member 312A, which reflects these RF radiation signals so that they propagate in the −Y direction, as illustrated in FIG. 10. In the preferred case where distance DA is equal to or about $\lambda_{RA}/4$, the reflected and non-reflected signals SD" are in phase. Electromagnetic uplink signals SU" from one or more client devices (not shown in FIG. 9 and FIG. 10) are reflected by radiation-reflecting member 312A and are received by antenna element 300A in a similar manner.

Figure 11:
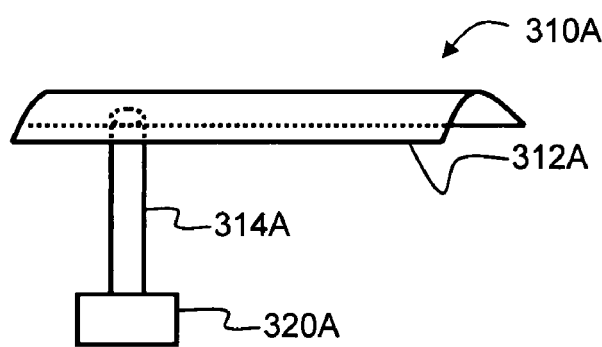
FIG. 11 is a perspective schematic diagram of an example embodiment of the radiation-reflector assembly of the present invention.
Figure 12:
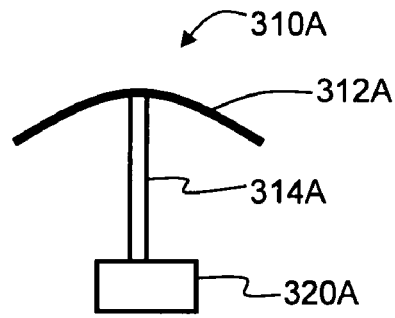
FIG. 12 is an edge-on view of the radiation-reflector assembly of FIG. 11.

FIG. 11 and FIG. 12 show respective close-up perspective and close-up edge-on views of radiation-reflector assembly 310A. In an example embodiment, reflecting member 312A is curved (e.g., cylindrically concave) to enhance the directionality of the reflected downlink signals SD", as well as the gain associated with received uplink signals SU". In an example embodiment, radiation-reflecting member 312A has a long dimension L about the same as that of the length of the corresponding antenna element 300A, and preferably having about 5% more resonant length. By way of example, for a 5.2 GHz antenna element 300A having a length of $\lambda_{RA}/4$, an example length L of radiation-reflecting member 312A is given by $1.05(\lambda_{RA}/4)=(c)/(4f_{RA})=(3\times10^{12} \text{ mm/s})/(4)(5.2\times10^{9} \text{ Hz})\sim 15$ mm, where c is the speed of light and $f_{RA}$ is the frequency that corresponds to wavelength $\lambda_{RA}$. For a frequency $\lambda_{RA}$=2.4 GHz, L~33 mm.

Figure 13:
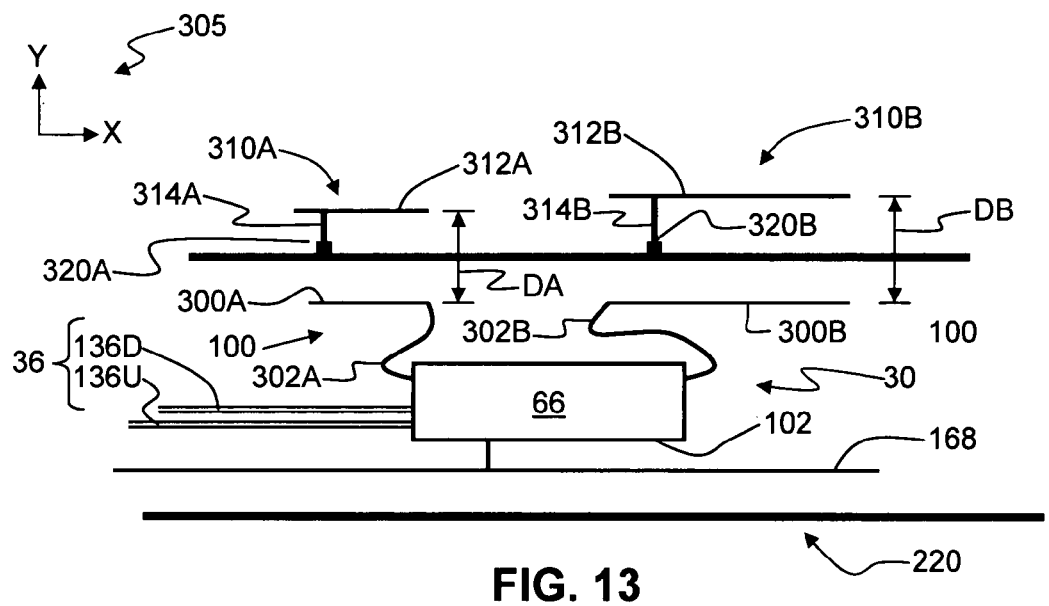
FIG. 13 is a schematic diagram similar to FIG. 8, showing an example embodiment of a transponder that includes two antenna elements that operate at different frequencies and two corresponding radiation-reflector assemblies.

FIG. 13 is a schematic diagram similar to that of FIG. 8, illustrating an example embodiment wherein antenna system 100 of transponder 30 includes two antenna elements 300A and 300B operably connected to converter pair unit 66 via respective coaxial cables 302A and 302B. In an example embodiment, antenna elements 300A and 300B operate at different frequencies, thus forming two different picocells (not shown). In an example embodiment, antenna element 300A transmits downlink signals SD" and receives uplink signals SU" in the 5 GHz band (having a center wavelength $\lambda_{RA}$), while antenna element 300B transmits downlink signals SD" and receives uplink signals SU" in the 2.4 GHz band (having a center wavelength $\lambda_{RB}$). Transponder 30 thus includes two radiation-reflector assemblies 310A and 310B arranged relative to corresponding antenna elements 300A and 300B at respective distances DA and DB. In an example embodiment, DA is equal to or about $\lambda_{RA}/4$, and DB is equal to or about $\lambda_{RB}/4$. Note that transponder 30 of FIG. 13 shows only one pair of downlink and uplink optical fibers 136D and 136U even though there are two antenna elements 300A and 300B operating at different frequencies. In this example embodiment, transponder 30 is adapted to multiplex and demultiplex the different RF frequencies associated with the different antenna elements onto the downlink and uplink optical fibers. In another example embodiment, downlink and uplink optical fibers 136D and 136U are provided for each antenna element, such as shown in FIG. 14, discussed below.

Figure 14:
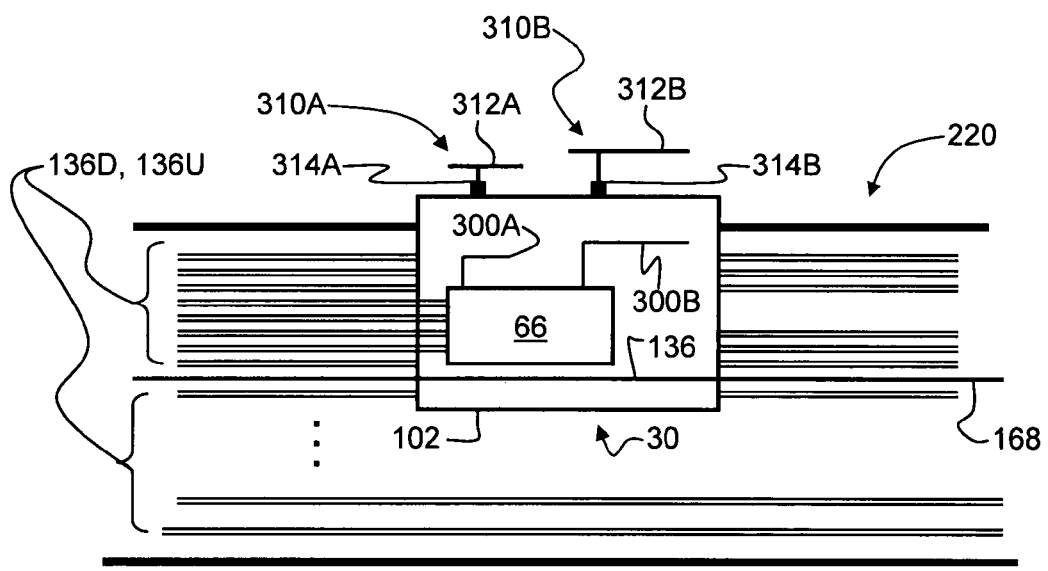
FIG. 14 is a detailed schematic side view of an example embodiment wherein a transponder is attached to the side of an optical fiber cable.
Figure 15:
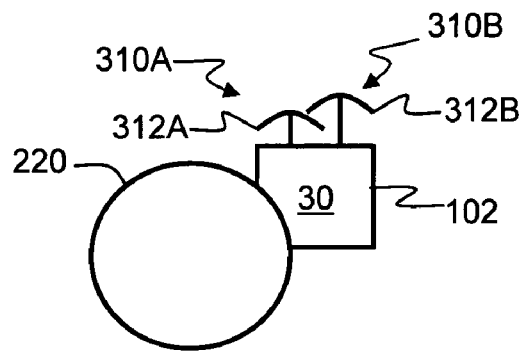
FIG. 15 is a schematic diagram illustrating an end-on view of the optical fiber cable and transponder of FIG. 14.

FIG. 14 is a detailed schematic side view of an example embodiment wherein a transponder 30 similar to that shown in FIG. 13 is attached to the side of optical fiber cable 220. Note that in FIG. 14, four optical fibers connect to transponder 30, namely a pair of downlink and uplink optical fibers 136D and 136U for each antenna 300A and 300B. Thus, respective pairs of downlink and uplink optical fibers carry the respective RF frequencies associated with the different antenna elements. FIG. 15 is an end-on view of the optical fiber cable of FIG. 14, showing how transponder 30 of FIG. 14 is arranged relative to optical fiber cable 220.

Figure 16:
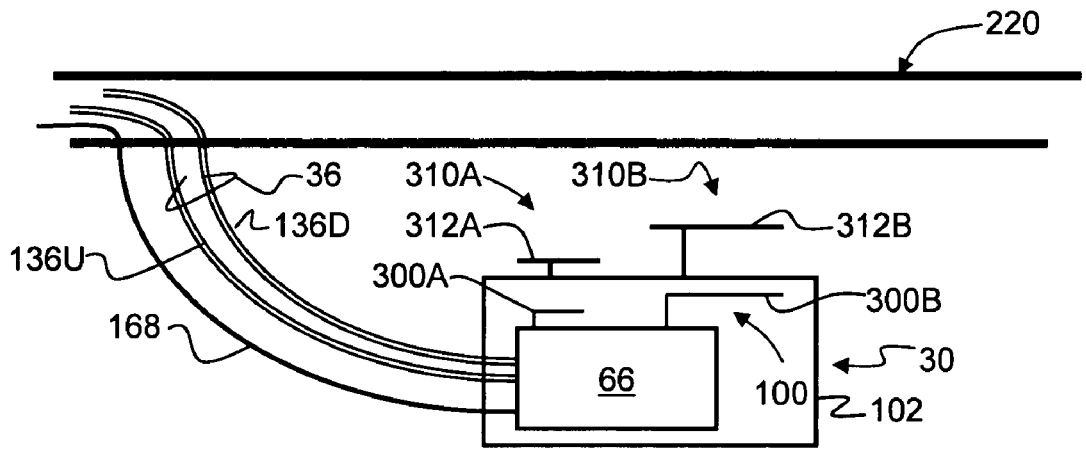
FIG. 16 is a schematic diagram of an example embodiment wherein the transponder is located remote from the optical fiber cable.

FIG. 16 is a schematic diagram of an example embodiment of transponder 30 and optical fiber cable 220, wherein the transponder is located remote from the optical fiber cable. One or two pairs of downlink and uplink optical fibers 136D and 136U (only one pair is shown for the sake of illustration) and electrical power line 168 extend from optical fiber cable 220 to remotely located transponder 30. In an example embodiment, the optical fibers and the electrical power line are included in a single tether cable, as discussed in greater detail below. Antenna system 100 is located within housing 102 so that radiation-reflector assemblies 310A and 310B are mounted atop housing 102 relative to the corresponding antenna elements 300A and 300B.

Figure 17:
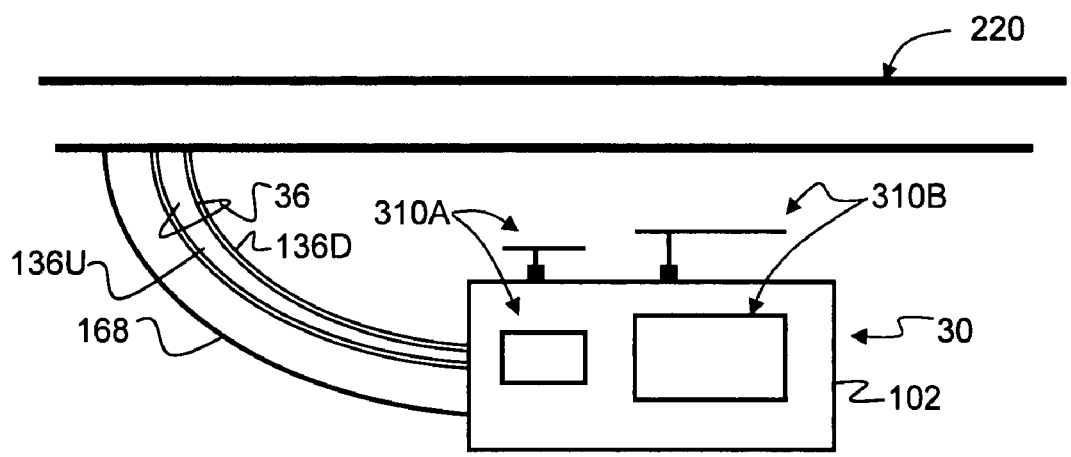
FIG. 17 is a schematic diagram similar to FIG. 16, illustrating an example embodiment wherein each antenna element has associated therewith a pair of radiation-reflector assemblies arranged on adjacent sides of the transponder housing.

FIG. 17 is similar to FIG. 16, and illustrates an example embodiment wherein each antenna element 300A and 300B has associated therewith a pair of radiation-reflector assemblies 310A and a pair of radiation-reflector assemblies 310B, respectively, mounted to adjacent sides of housing 102 relative to the corresponding antenna element. This arrangement provides additional directivity for downlink signals SD" and uplink signals SU".

Figure 18:
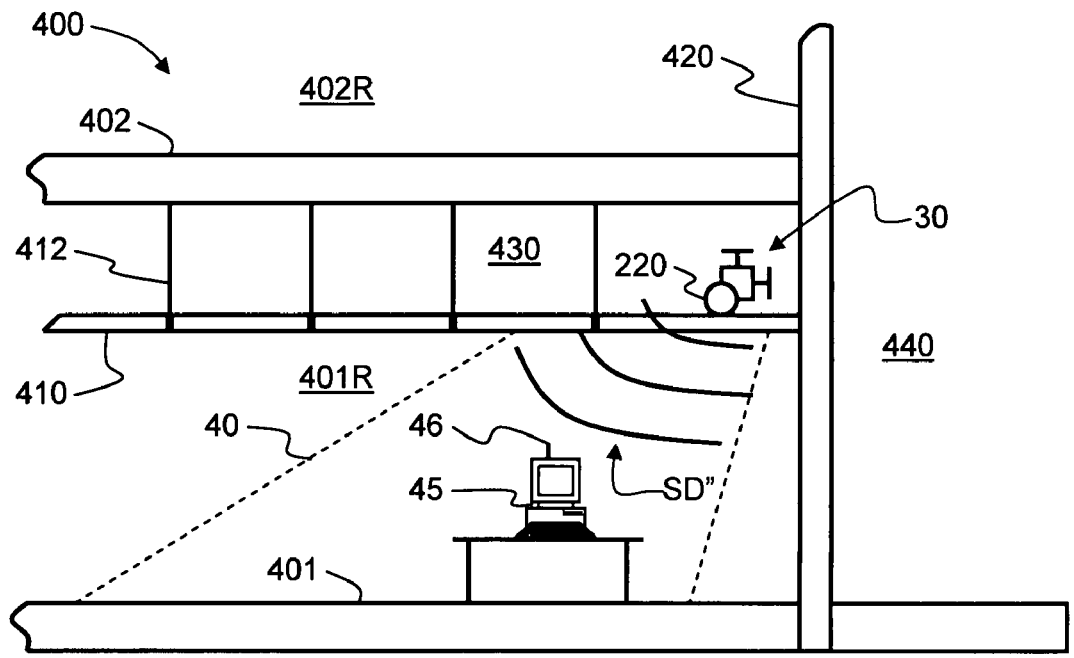
FIG. 18 is a schematic cross-sectional diagram of a building infrastructure and an optical fiber cable deployed therein, illustrating an example application of the transponder illustrated in FIG. 17.

FIG. 18 is a schematic cross-sectional diagram of a building infrastructure 400 illustrating an example application of the example transponder 30 as illustrated in FIG. 17. Building infrastructure 400 includes a first floor 401 that partly defines a corresponding first-floor room 401R, and includes a second floor 402 that partly defines a corresponding second-floor room 402R. A drop ceiling 410 is suspended by suspension lines 412 connected to the second floor and that depend downwards a certain distance towards the first floor 401. Building infrastructure 400 also includes an outer wall 420. Drop ceiling 410, second floor 402, and outer wall 420 define a ceiling space 430 within which pipes, wires, ducts and other building utilities are run. An optical fiber cable 220 is arranged in ceiling space 430 and has the example transponder 30 of FIG. 17 operably incorporated therewith. Transponder 30 is arranged next to outer wall 420. In this arrangement, it is often undesirable for downlink signals SD" and/or uplink signals SU" to be transmitted to or received from second-floor room 402R and/or to and from an outside environment 440 on the outside of outer wall 420. Transponder 30 thus serves to direct downlink signals SD" of first and second frequencies from the respective first and second antennas 300A and 300B into a portion of first-floor room 401R, thereby defining a highly localized two-frequency picocell 40 that does not extend with any significant power either to second-floor room 402R or to outside environment 440. Such an arrangement is particularly useful when outside wall 420 does not significantly attenuate RF signals.

Figure 19:
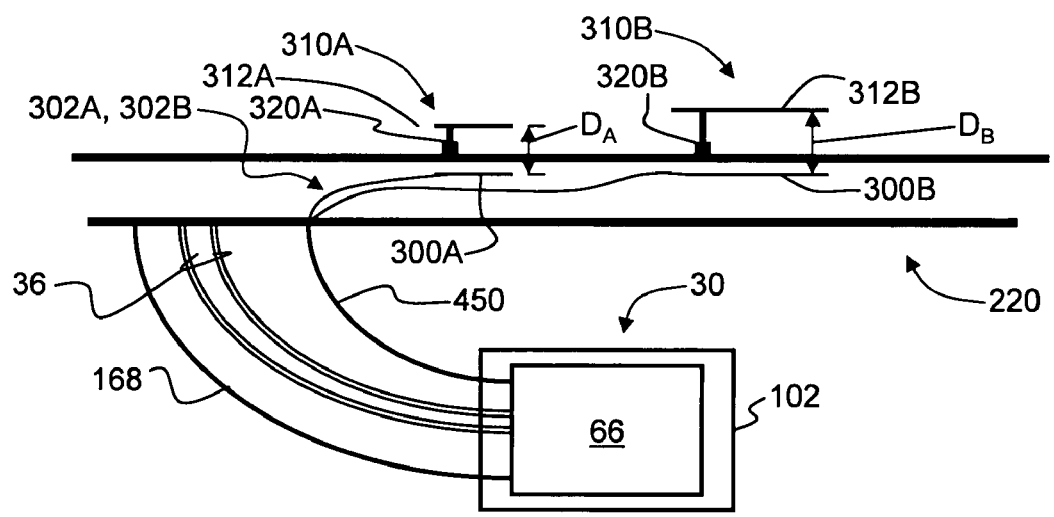
FIG. 19 is a schematic diagram similar to FIG. 16, illustrating a transponder wherein the antenna elements are located in optical fiber cable rather than within the remotely located transponder housing, and wherein the radiation-reflector assemblies are fixed to the optical fiber cable relative to the antenna elements.

FIG. 19 is a schematic diagram illustrating an example embodiment of transponder 30 similar to that of FIG. 16, but wherein antenna elements 300A and 300B are located in optical fiber cable 220 rather than within housing 102. Antenna elements 300A and 300B are electrically connected to converter pair unit 66 via an antenna cable 450 that includes respective coaxial cables 302A and 302B as discussed above. In this embodiment, radiation-reflector assemblies 310A and 310B are attached to optical fiber cable 220, e.g., via mounting members 320A and 320B fixed thereto. It is worth noting that in a particular example of this example embodiment, distances $D_A$ and $D_B$ are equal to or about $\lambda_{RA}/4$ and $\lambda_{RB}/4$, respectively.

Figure 20:
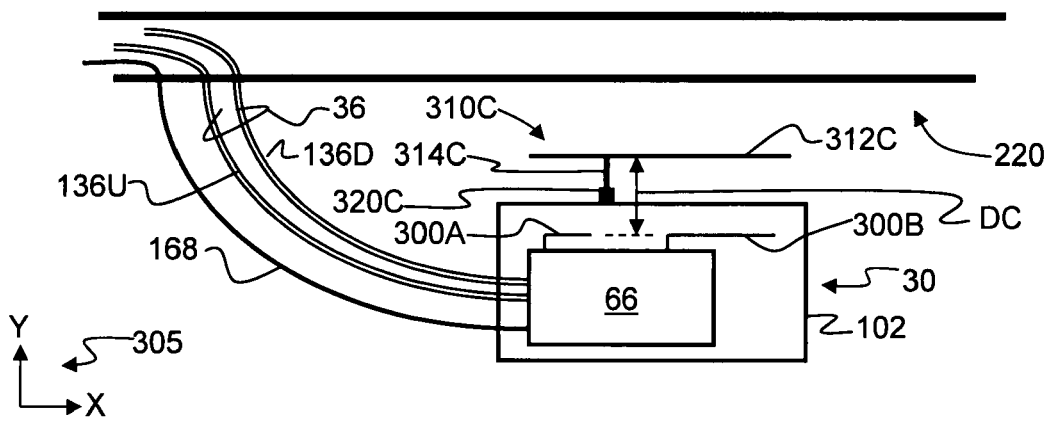
FIG. 20 is a schematic diagram similar to FIG. 16, illustrating an example embodiment wherein a single radiation-reflector assembly is used to reflect radiation from two separate antenna elements.

FIG. 20 is a schematic diagram similar to FIG. 16, illustrating an example embodiment wherein a single radiation-reflector assembly 310C is used to reflect radiation associated with two or more antenna elements—here, two antenna elements 300A and 300B. Radiation-reflector assembly 310C has a reflecting member 312C located a distance DC away from the plane of antennas 300A and 300B and has dimensions (particularly in the X-direction) sufficient for it to cover or substantially cover (i.e., reside above) both antenna elements. Radiation-reflecting assembly 310C also includes support member 314C and mounting member 320C that engages the support member.

In an example embodiment, distance DC is at or about $\lambda_R/4$ of one of the wavelengths from either antenna element 300A or 300B. In another example embodiment, distance DC is given by $(\lambda_{RA}/4+\lambda_{RB}/4)/2$, wherein $\lambda_{RA}$ and $\lambda_{RB}$ are the aforementioned center wavelengths of the frequency bands of antenna elements 300A and 300B, respectively. In another example embodiment, distance DC is set to be at or about $\lambda_{RA}/4$ or $\lambda_{RB}/4$.

While the single radiation-reflector assembly 310C does not typically provide the same degree of efficiency as an arrangement where each antenna element has its own radiation-reflector assembly, it still is able to provide an effective degree of radiation directivity and isolation, and thus enhanced transponder performance.

In general, at least one radiation-reflecting member is arranged relative to either a corresponding at least one antenna element or to one or more antenna elements, so as to provide enhanced antenna directivity as compared to not having the at least one radiation-reflecting member so arranged.

A transponder 30 having enhanced directionality has a number of important advantages over a transponder that does not have an associated radiation-reflector assembly. One advantage is reduced interference with other transponders by substantially reducing the amount of radiation that travels in an unwanted direction or to an unwanted location. For example, as described above in connection with FIG. 18, blocking downlink signals SD" from traveling to different rooms in a building prevents multi-floor interference between picocells.

Enhanced antenna directivity also decreases the amount of cross-talk between picocells 40 that use the same subcarrier frequency. Thus, one can achieve small picocell size without an increase in the cross-talk penalty.

The enhanced directivity of transponder 30 of the present invention also improves communication efficiency by redirecting otherwise wasted radiation back into the picocell associated with the transponder. This also has the effect of improved wireless security by blocking unwanted leakage of the picocell to unwanted areas, such as outside of a building or other offices or common areas of a building, as described above in connection with FIG. 18.

The enhanced directivity of transponder 30 of the present invention also facilitates the formation of wireless-free zones. Such zones may be desired in certain locations, such as laboratories where very sensitive measuring equipment is located, or in hospitals where RF wireless signals might interfere with patient care.

Also, as discussed above, the enhanced directivity of transponder 30 of the present invention can be used to optimize wireless performance in particular regions of a building. For example, transponders located next to a wall are likely to have a large portion of its energy absorbed by or transmitted through the wall. By orienting the radiation patterns of such transponders using one or more radiation-reflector assemblies (see, e.g., FIG. 18), improved or optimized performance for a given situation can be obtained. Likewise, certain RoF wireless picocellular system deployment scenarios may require or otherwise benefit from directional antennas. For instance, wireless access in a stairwell is made possible by a transponder with an antenna system having an antenna radiation pattern tailored to the stairwell geometry.

The radiation-reflector assembly of the present invention is also preferably adapted for quick deployment, using for example so-called snap-engagement of the different parts of the assembly. This allows for quick and efficient installation of the associated RF wireless picocellular system.

Transponder Node Assembly

Conventional ROF wireless picocellular systems have a single transponder 30 associated with each picocell 40, as shown in FIG. 4. For such systems, the spacing between transponders 30 (or, more precisely, the associated antenna systems 100) can be made relatively large, e.g., larger than the 5-10 meters typically employed to obtain full wireless coverage for a given area without the picocells having substantial spatial overlap. However, this relatively small spatial separation between transponders allows for the use of relatively short lengths of coax cables to carry the RF signals to the transponder antenna systems. This allows for integrating two or more transponders into a single assembly, referred to herein as a "transponder node assembly."

Figure 21:
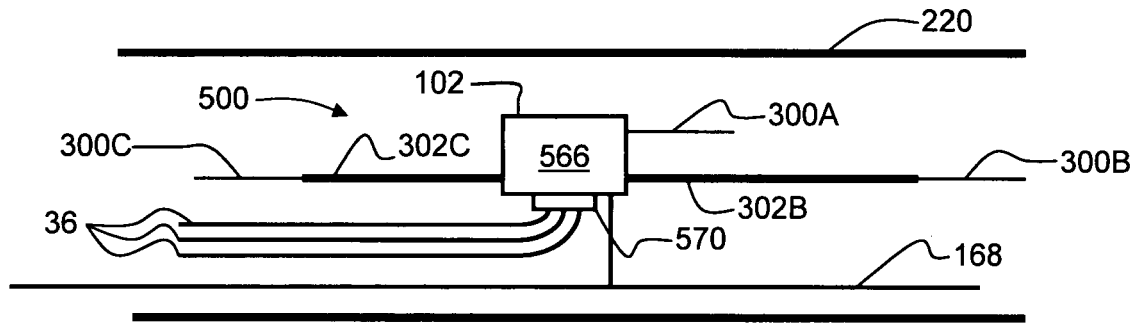
FIG. 21 is a schematic diagram of an example embodiment of a transponder node assembly according to the present invention that integrates two or more transponders, with the transponder node assembly shown incorporated into an optical fiber cable.

FIG. 21 is a schematic diagram of an example embodiment of a transponder node assembly 500 according to the present invention, as shown incorporated into optical fiber cable 220. Transponder node assembly 500 includes a converter pair assembly 566 to which is electrically coupled two or more antenna elements 300. In the example transponder node assembly 500 shown in FIG. 21, three antenna elements 300A, 300B and 300C are shown, wherein antenna elements 300B and 300C are electrically coupled to converter pair assembly 566 via respective coaxial cable sections 302B and 302C, while antenna element 300A is connected directly to the converter pair assembly (i.e., the coaxial cable is internal to housing 102). Three optical fiber RF communication links 36 are optically coupled to transponder node assembly 500, preferably via a multi-fiber optical connector 570.

Figure 22:
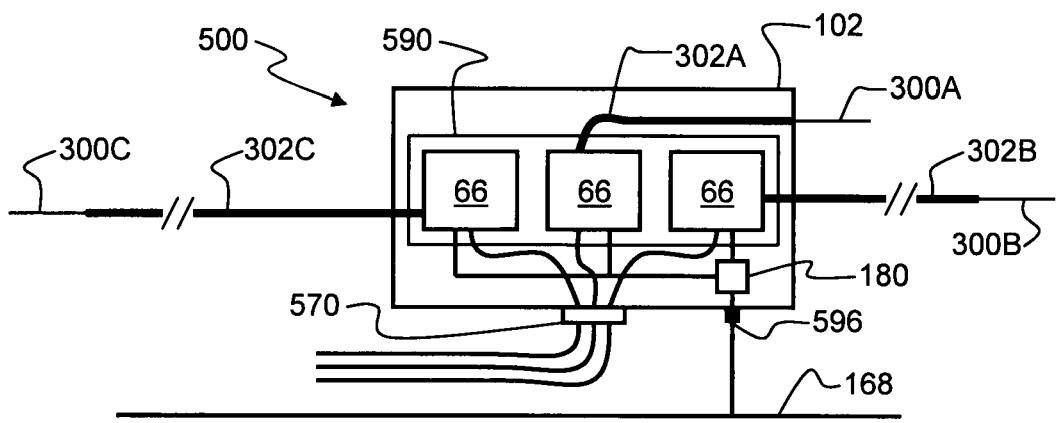
FIG. 22 is a close-up detailed schematic diagram of an example embodiment of the transponder node assembly of FIG. 21.

FIG. 22 is a close-up schematic diagram of an example embodiment of transponder node assembly 566. Transponder node assembly 566 includes two or more converter pair units 66, such as the three shown in the present example embodiment. A single DC power converter 180 is employed, rather than having one for each converter pair unit 66. Also, in an example embodiment, transponder node assembly 500 includes a single heat sink 590 in thermal communication with converter pairs 66, rather than three separate heat sinks for each converter pair unit. Likewise, the various electronic elements (not shown) used in transponder 30 are preferably placed on a single printed circuit board (not shown) rather than having a separate printed circuit board for each transponder 30. Similarly, a single protective housing 102 is used rather than separate housings for each transponder, and a single electrical power connector 596 is also used to connect to electrical power line 168. In general, the consolidation and integration of the various parts of the two or more transponders 30 into transponder node assembly 500 results in a significant cost savings—estimated to be about 20% to 30% when integrating five transponders into a single transponder node assembly. In addition, transponder node assembly 500 can be made very compact (e.g., nearly the size of a single transponder unit 30) by using a light source array (e.g., VCSEL arrays), a photodetector array, optical connectors, and other like components normally used for integrating and/or packaging micro-optical and integrated optical systems. In an example embodiment, transponder node assembly 500 includes two or more antenna systems arranged to provide a picocell spacing of at least five meters. Here, "picocell spacing" means the distance from the center of one picocell to the center of the adjacent picocell.

By way of example, for a transponder node assembly 500 having the capability of five transponders and for a node (picocell) spacing of 5 meters, the longest length of coaxial cable 302 for antenna elements 300 is 10 meters. Using commercially available coaxial cable such as Astrolab 3205 cable (available from www.astrolab.com), the RF loss over the 10 meters is only about 5 dB, which is acceptably low for RoF wireless picocellular systems.

The transponder node assembly of the present invention thus enables a method of forming picocells in a radio-over-fiber (RoF) wireless picocellular system. This method includes forming transponder node assembly 500 as described above, e.g., by combining two or more converter units 66 into housing 102 and connecting respective two or more antenna systems 100 to the corresponding two or more converter units. The method also includes distributing the two or more antenna systems 100 to corresponding two or more locations, e.g., throughout optical fiber cable 220 so as to form two or more corresponding picocells 40 (such as formed in FIG. 4 with separate transponders 30). Picocells 40 have respective two or more spatial locations corresponding to the relative locations of the respective two or more antenna systems 100. In an example embodiment, the method includes providing a separation between adjacent antenna systems of between about 2 m and about 10 m.

Transponder RFID System

Figure 23:
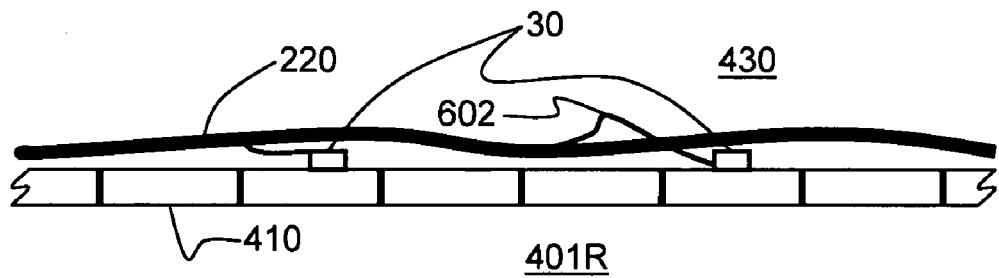
FIG. 23 is a close-up schematic diagram of a portion of the building infrastructure shown in FIG. 18, including an optical fiber cable deployed in the ceiling space above the drop-ceiling, with remote transponders operably coupled to the optical fiber cables with respective tether cables.

A typical cable installation scenario associated with deploying a RoF wireless picocellular system involves placing optical fiber cable 220 and the transponders 30 either incorporated therein or operably coupled thereto atop ceiling tiles in a building. FIG. 23 is a close-up of a portion of the building infrastructure shown in FIG. 18, including an optical fiber cable 220 deployed above drop-ceiling 410 in ceiling space 430. Two transponders 30 are shown, wherein the transponders are located remote from optical fiber cable and are operably coupled thereto via respective tethers 602 that include downlink and uplink optical fibers 136D and 136U, along with electrical power line 168 (not shown). Transponders 30 may be separated by, for example, 5 to 10 meters and might lay 1 to 2 meters away from optical fiber cable 220.

While such hidden installation is preferred for aesthetic reasons, it is often difficult to locate transponders after installation, either for maintenance, repair or other adjustments such as position adjustment to adjust the location or coverage of the corresponding picocell. Since optical fiber cable 220 is hidden by drop ceiling 410, quick location of a given transponder 30 is a difficult and time-consuming task.

Figure 24:
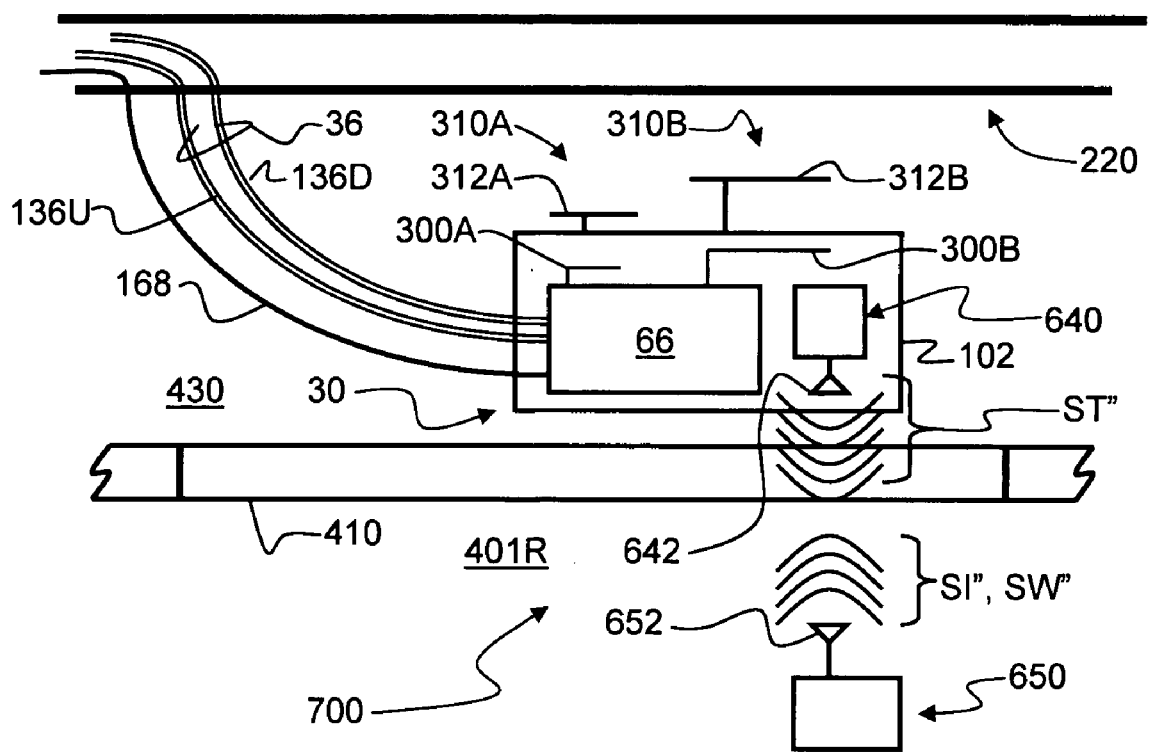
FIG. 24 is a close-up view of FIG. 23, illustrating an example embodiment of the transponder therein having a transponder RFID tag, and also showing a RFID-tag reader in the room below the drop ceiling, wherein the transponder RFID tag and the RFID-tag reader comprise a transponder RFID system.

Accordingly, an aspect of the present invention involves providing at least one transponder 30 (and preferably most if not all of the transponders in a RoF wireless picocellular system) with a RFID tag. FIG. 24 is a close-up view of FIG. 23, illustrating an example embodiment of transponder 30 having a RFID tag 640, and also showing a RFID-tag reader 650 in room 401R below drop ceiling 410. Note that the example transponder 30 of FIG. 24 has its antenna system 100 located within housing 102 for the sake of illustration. Transponder 30, along with RFID tag 640 and RFID tag reader 650, constitute what is referred to herein as "transponder RFID system" 700.

Figure 25:
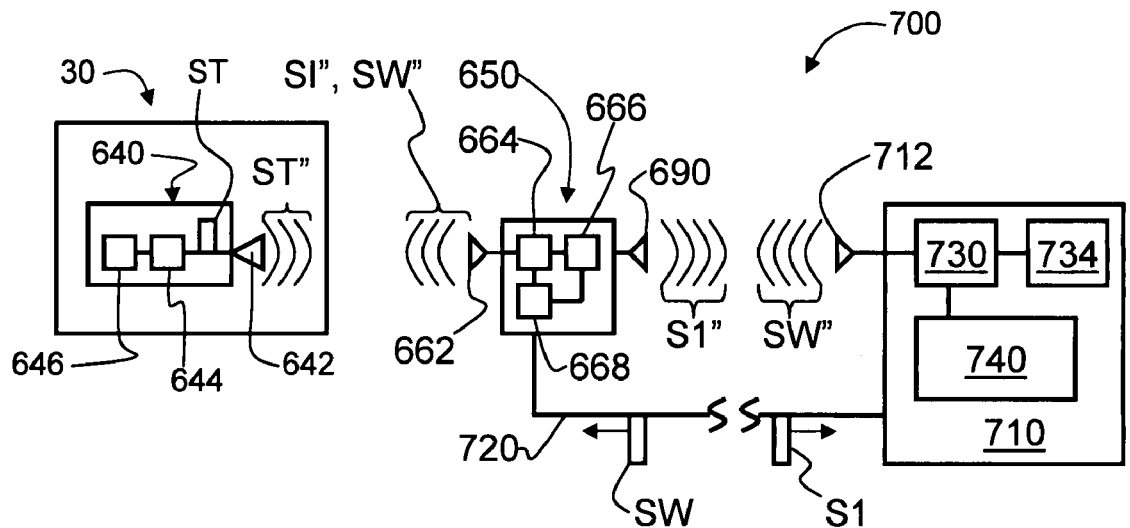
FIG. 25 is a more detailed schematic diagram of the transponder RFID system of FIG. 24, shown in a different orientation for ease of illustration, wherein the RFID tag system includes a database unit operably coupled to the RFID-tag reader.

FIG. 25 is a more detailed schematic diagram of transponder RFID system 700 shown in a different orientation than that of FIG. 24 for ease of illustration and explanation. RFID tag 640 includes a receive/transmit antenna 642 and a microcircuit 644 (e.g., in the form of a microchip) electrically connected to the antenna. A memory unit 646 (e.g., a memory chip) is electrically connected to microcircuit 644. Memory unit 646 is adapted to store information ("RFID tag data"), which in an example embodiment includes at least one property of the associated transponder 30, but more typically includes a number of such properties, such as the date of installation, the operating frequency band or bands, maintenance history, output power, the number of antenna systems and/or antenna elements, the distance to the nearest transponders (e.g., as measured along the optical fiber cable), and the like. In an example embodiment, RFID tag signal ST (discussed below) is representative of a unique RFID tag number that has associated therewith one or more properties (such as the transponder properties mentioned above) that are stored in RFID tag reader 650 and/or an RFID database 710 (discussed below).

RFID reader 650 includes a receive/transmit antenna 662, a signal processing circuit 664 electrically connected thereto, and a memory unit 666 electrically connected to the signal processing circuit. RFID tag reader 650 also includes other electronic components that are not essential to the present invention and so are not shown. In an example embodiment, RFID tag reader 650 includes a GPS unit 668 adapted to provide GPS data to signal processing circuit 664 and/or to memory unit 666.

With continuing reference to FIG. 25, in the operation of transponder RFID system 700, signal processing circuit 664 generates an interrogation signal SI and transmits it via antenna 662 to RFID tag 640 as an electromagnetic interrogation signal SI". In an example embodiment, signal processing circuit 664 is also adapted to either generate or pass along a "write signal" SW that carries information to be written to a write-able type of RFID tag 640 via a corresponding electromagnetic write signal SW". The information in the write signals is based on, for example, information either stored in memory unit 666, entered into the RFID tag reader directly by a user, or communicated to it from a database unit, as described below.

Microcircuit 644 in RFID tag 640 is adapted to receive at antenna 642 interrogation signal SI" and to process this signal. The processing includes, for example, comparing the received interrogation signal SI" to a corresponding bit sequence stored in memory unit 646. In an example embodiment, microcircuit 644 is adapted to use the energy in interrogation signal SI" to power itself. If the proper content of the received interrogation signal SI" is confirmed, then microcircuit 644 is adapted to generate a RFID tag signal ST representative of the stored RFID tag data and to transmit this signal via antenna 642 to RFID reader 650 as an electromagnetic tag signal ST" to be read by the RFID tag reader. In an example embodiment, RFID tag reader 650 is adapted to generate a "ping" interrogation signal SI" that simply elicits a "ping" electromagnetic tag signal ST" from RFID tag 640, wherein the ping form of signal ST" is used located the RFID tag.

In an example embodiment, at least some of the RFID tags 640 are adapted to generate RFID tag signals ST" at a frequency suitable for long-range RFID-tag reading, such at the 915 MHz band or the 2.45 GHz band. Such RFID tags are best suited for aerial or aboveground applications, or more generally for RFID-tag locations that are not buried or otherwise obstructed by an intervening RF-frequency-absorbing medium. Suitable RFID tags for the present invention are available from Alien Technologies, Inc., as Model Nos. ALL-9440 and ALL-9350.

In an example embodiment, RFID tag reader 650 and one or more of RFID tags 640 are adapted with encryption capability so that the interrogation signal SI and the RFID tag signal ST can be encrypted to prevent third parties from reading or overwriting RFID tag data.

RFID tag reader 650 is also adapted to receive electromagnetic RFID tag signal ST" via antenna 662, which converts this signal back into electrical RFID tag signal ST. Signal processing circuit 664 is further adapted to extract the RFID tag data from this signal and store this data in memory unit 666.

In an example embodiment, transponder RFID system 700 includes a database unit 710 operably coupled to RFID reader 650 so that information can be transmitted to and receive from the database unit. In an example embodiment, database unit 710 includes a transmit/receive antenna 712 used to wirelessly communicate with RFID tag reader 650, through a WiFi network or through the cellular phone network, as examples. In another example embodiment, database unit 710 is operably coupled to RFID tag reader 650 via a non-wireless (e.g., an electrical or optical) communication link 720, such as an Ethernet link.

Database unit 710 includes a microprocessor 730 operably connected thereto, a memory unit 734 operably coupled to the microprocessor, and a display 740 operably coupled to the microprocessor. In an example embodiment, database unit 710 is or otherwise includes a computer, such as a laptop computer, personal computer or workstation. In an example embodiment, database unit 710 is mobile (e.g., as a laptop computer or hand-held device) and is brought out to the field to be accessible to those working in the field to deploy or maintain the RoF wireless picocellular system. Also in an example embodiment, database unit 710 supports a graphical user interface (GUI) so that a database-unit user can view graphical images and interact with interactive graphical images on display 740.

In an example embodiment, RFID tag reader 650 transmits RFID tag data to database unit 710 either non-wirelessly via a non-wireless data signal S1 sent over communication link 720, or wirelessly via electromagnetic data signal S1". Database unit 710 then stores and processes the RFID tag data, such as described below.

Also in an example embodiment, database unit 710 either wirelessly and/or non-wirelessly transmits write information in respective write signals SW and/or (electromagnetic) signal SW" to RFID tag reader 650. The write signals are then sent by RFID tag reader 650 as an electromagnetic write signal SW" to one or more write-able RFID tags 640 and stored therein as RFID tag data.

Microprocessor 730 in database unit 710 is adapted to process the RFID tag data in RFID tag signals ST to glean useful information about the corresponding transponders 30. In an example embodiment, this information is displayed on display 740. In an example embodiment, the information is represented as graphics, and further is presented by database unit 710 in the form of one or more interactive maps of the RoF wireless picocellular system that include the location of one or more transponders 30. In an example embodiment, the location information includes GPS coordinates supplied by GPS unit 668.

Figure 26:
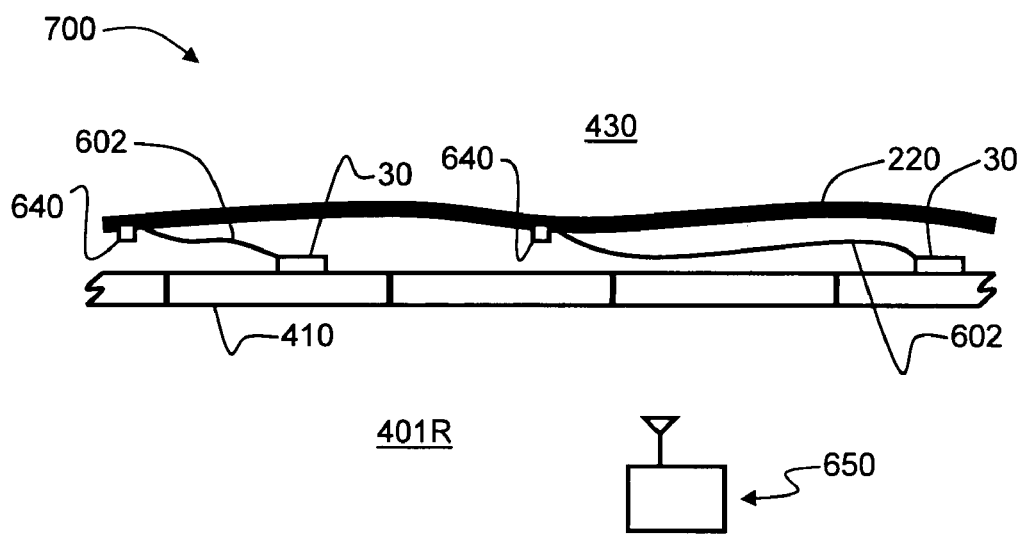
FIG. 26 is a schematic diagram of an example embodiment of the transponder RFID system of the present invention similar to that shown in FIG. 23, illustrating an example embodiment wherein transponders are located remote from optical fiber cable via tether cables and wherein the RFID tags are located on the optical fiber cable at or near where the tether cables connect to the optical fiber cable.

FIG. 26 is a schematic diagram of transponder RFID system 700 similar to that shown in FIG. 23, illustrating an example embodiment wherein transponders 30 are located remote from optical fiber cable 220 via tether cables 602, and wherein RFID tags 640 are located on the optical fiber cable, e.g., at or near the location where tether cables 602 are attached to the optical fiber cable.

Figure 27:
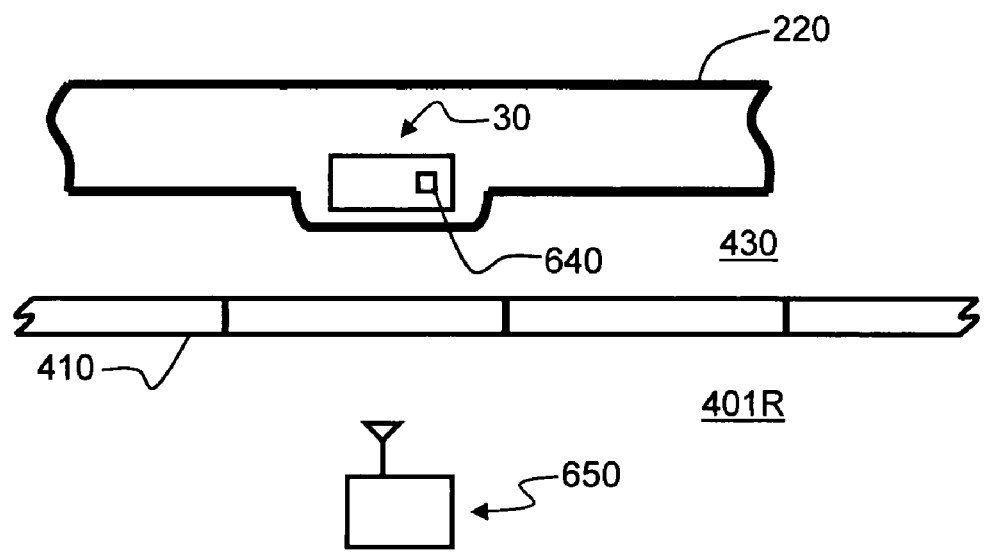
FIG. 27 is a schematic diagram of an example embodiment of the transponder RFID system of the present invention similar to that shown in FIG. 26, but wherein the transponders and the associated RFID tags are located within optical fiber cable.

FIG. 27 is a schematic diagram of transponder RFID system 700 similar to FIG. 26, but wherein the transponders and thus the RFID tags 640 are located within optical fiber cable 220.

Transponder Mode Selection Via the RFID Tag

In an example embodiment of the present invention, when transponders 30 are not in use, they are adapted to transition from a "fully operational" mode to a "stand-by" power-saving mode by turning off main energy consuming elements therein. One approach to returning transponder 30 to the fully operational mode or placing the transponder directly into the stand-by mode is to do so via RFID tag 650.

Figure 28:
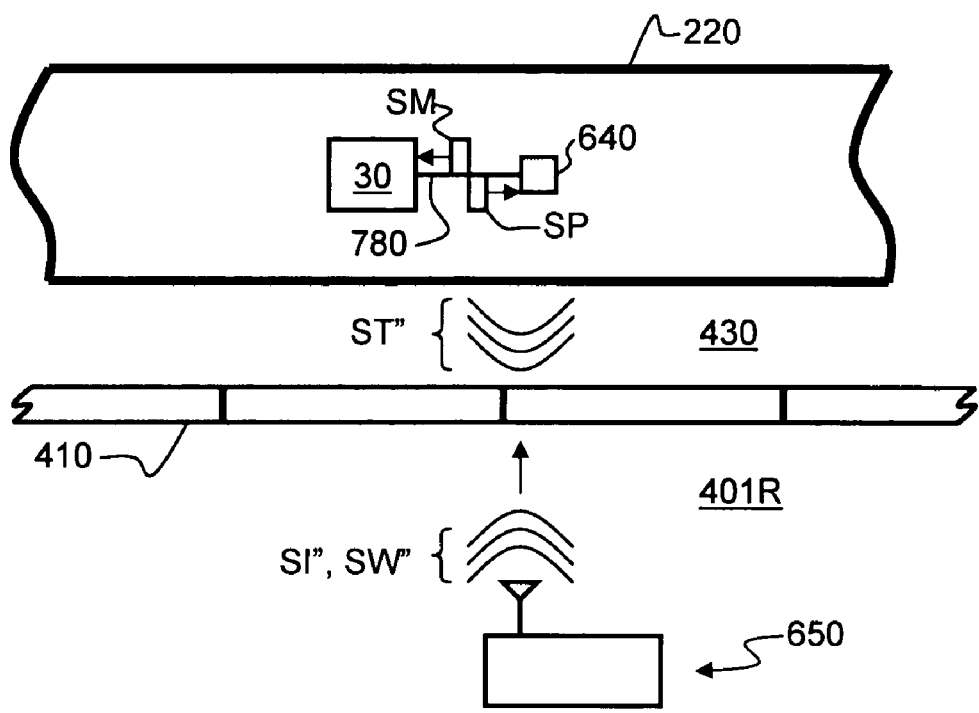
FIG. 28 is a schematic diagram illustrating an example embodiment of the transponder RFID system of the present invention similar to that shown in FIG. 24, wherein the RFID tag is electrically connected to the transponder.

FIG. 28 is a schematic diagram illustrating an example embodiment of the transponder RFID system of the present invention, wherein RFID tag 640 is electrically connected to transponder 30 via an electrical connection 780. When RFID tag 640 is addressed with an appropriate signal, such as interrogation signal SI" (or a particular sequence of such signals), or via a particular write signal SW", a mode signal SM is generated in the RFID tag and sent to transponder 30 over electrical connection 780. Signal SM is then used to change the operational mode of transponder 30.

This example embodiment is particularly effective if RFID tag 640 is of the chargeable type, which tends to have a longer read range. When RFID tag 640 is chargeable, then in an example embodiment, power from transponder 30 is sent over electrical connection 780 in the form of power signal SP to the RFID tag to charge the RFID tag.

Tether Cable Assembly

Figure 29:
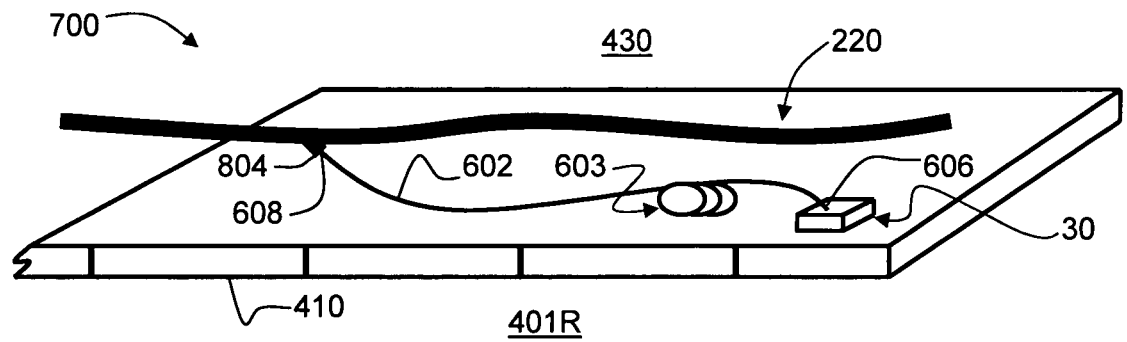
FIG. 29 is a perspective schematic diagram similar to FIG. 26, illustrating an example of how the optical fiber cable and the remote transponder can be arranged in the ceiling space above a section of the drop-ceiling using a tether cable.

FIG. 29 is a perspective schematic diagram similar to FIG. 26, showing an example of how optical fiber cable 220 can be arranged in ceiling space 430 above a section of drop-ceiling 410. Optical fiber cable 220 includes one or more connectors 804 that serve as access points for corresponding one or more tether cables 602 each having first and second ends 606 and 608. The first ("proximal") tether cable end 606 is shown connected to transponder 30 while the second ("distal") tether cable end 608 is shown connected to optical fiber cable 220 via connector 804. Another connector 804 (not shown) can also be used at transponder 30 to connect tether cable end 606 to the transponder.

After optical fiber cable 220 is deployed, the usual procedure is to then connect the tether cable ends 606 and 608 to transponder 30 and to optical fiber cable 220, respectively, and then place the transponder in its final position according to the desired picocell location for that transponder. In the usual case where tether cables 602 are all of a fixed length, there is typically some amount of slack that requires a portion 603 of the tether cable to be coiled and neatly stored. Also, conventional tether cables 602 are usually coiled for packaging and shipping and then uncoiled when the transponders are deployed.

Figure 30:
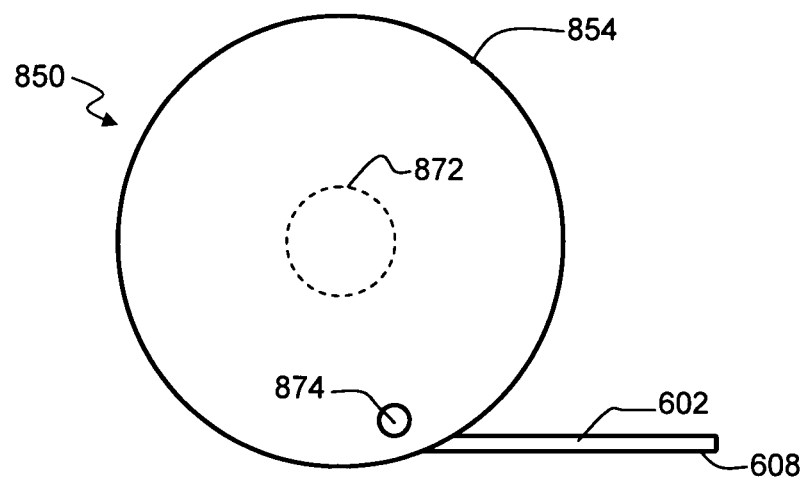
FIG. 30 is a top-down view of an example tether cable assembly according to the present invention wherein the tether cable is stored within a housing and deployed and retracted as needed.
Figure 31:
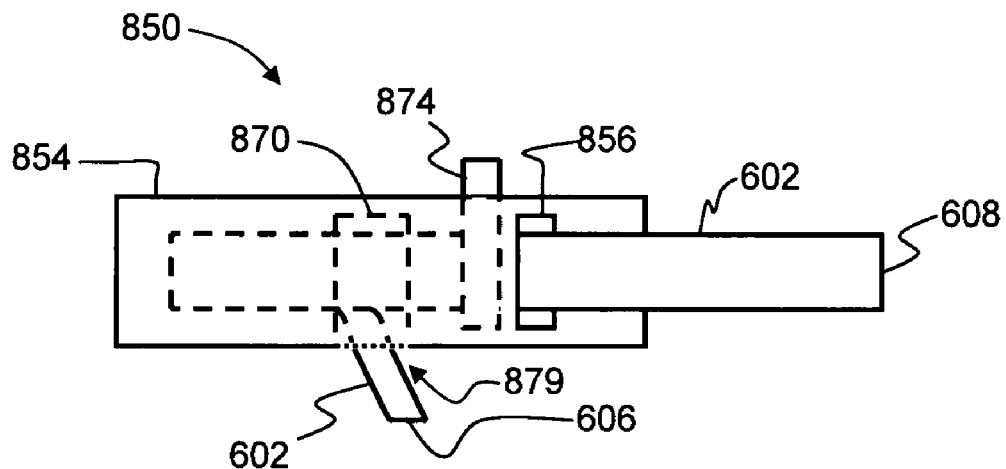
FIG. 31 is a side view of the tether cable assembly of FIG. 30.
Figure 32:
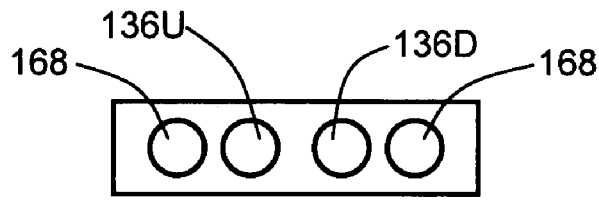
FIG. 32 is a cross-sectional diagram of an example embodiment of the tether cable used in the tether cable assembly of FIG. 31, wherein the tether cable has a rectangular cross-section and supports two optical fibers and two electrical power lines.

FIG. 30 is a plan schematic diagram of an example embodiment of a tether cable assembly 850 according to the present invention, and FIG. 31 is a side view of the same assembly. Assembly 850 includes a housing 854 that contains tether cable 602. FIG. 32 is a close-up cross-sectional view of an example embodiment of a ribbon-type tether cable 602 used in tether cable assembly 850. Ribbon tether cable 602 includes at least one optical fiber and at least one wire, and in a preferred embodiment includes downlink and uplink optical fibers 136D and 136U and at least one electrical power line 168 (two such power lines are shown in FIG. 32).

With reference again to FIG. 30 and FIG. 31, housing 854 includes a slot 856 (e.g., a rectangular slot) sized so that ribbon-type tether cable 602 passes therethrough when dispensed from or retracted into the housing. Thus, housing 854 houses some or all of tether cable 602 in coiled form, depending on how much of the tether cable is dispensed from the housing.

Figure 33:
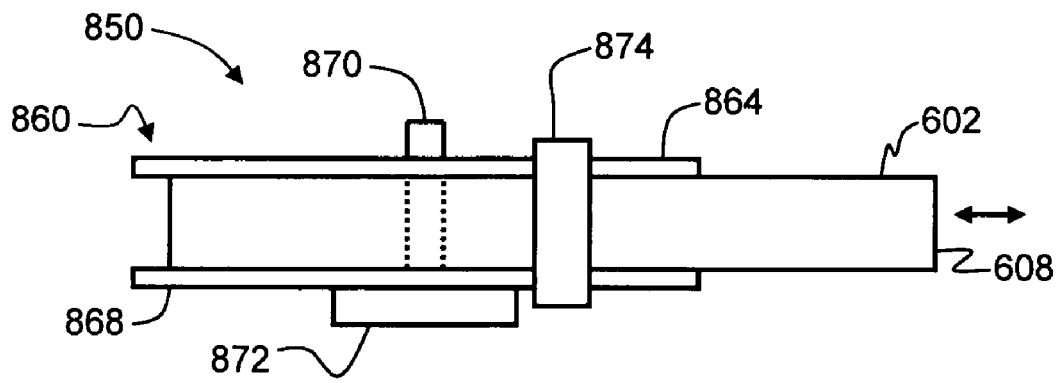
FIG. 33 is a schematic diagram of the tether cable assembly similar to the side view of FIG. 31, but without the housing, showing an example internal configuration that includes a spool operably connected to a retracting member, and a locking device that engages the tether cable.

FIG. 33 is a side-view of tether cable assembly 850 with housing 854 removed. Tether cable assembly 850 further includes in an example embodiment a spool 860 having a first flange 864 (referred to herein the "upper flange") and an opposing flange 868 (referred to herein as the "lower flange"). A central post 870 extends between the two flanges and the tether cable is coiled around the central post. In an example embodiment, central post 870 is connected to lower flange 868, which rotates with respect to upper flange so that rotating the lower flange dispenses (uncoils) or retracts (coils) tether cable 602.

In an example embodiment, lower flange 868 and/or central post 870 is/are operably connected to a retracting unit 872 so that tether cable 602 can be either automatically or selectively retracted (coiled). In an example embodiment, retracting unit 872 is or includes a spring.

In an example embodiment having such a retracting unit, tether cable assembly 850 also preferably includes a locking mechanism 874 that selectively engages and disengages (e.g., via manual operation) tether cable 602 so that a select amount of the tether cable can be dispensed and remain dispensed if not otherwise held in place.

Figure 34:
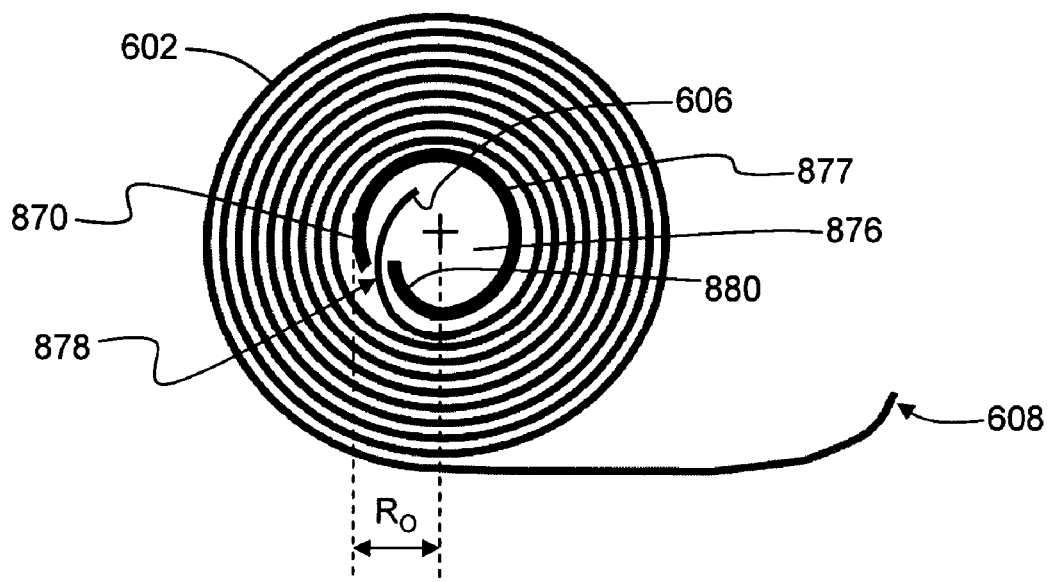
FIG. 34 is a top-down view of the spool shown in FIG. 33, but with the top flange removed to show the coiled tether cable with one tether cable end located within the hollow central post.

FIG. 34 is a top-down view of spool 860 with upper flange 864 removed to show a portion of tether cable 602 wound around central post 870. In an example embodiment, central post 870 is hollow and includes a wall 876 that defines a central post interior 877. Wall 876 includes an aperture 878 formed therein sized to accommodate tether cable 602 at proximate tether cable end 606 so that this end can reside in and/or pass through central post interior 877. With reference again to FIG. 31, in an example embodiment, proximate tether cable end 606 passes through central post interior 873 and passes outside of housing 854, e.g., through an aperture 879 formed in the underside of the housing at the location of central post 872.

Most optical fibers are strongly affected by small-radius bends. For example, standard single-mode fiber such as SMF-28 from Corning, Inc., has a high attenuation at small bending radii. Accordingly, assembly 850 is adapted to control the amount of bending of ribbon-type tether cable 602.

With continuing reference to FIG. 34, central post 870 has an outer radius $R_O$. Outer radius $R_O$ is greater than a certain minimum tether cable bend radius $R_C$ so that when tether cable 602 is wound around spool 860, the tether cable always maintains a sufficiently large bend radius (i.e., is always greater than the minimum bending radius $R_C$) to prevent significant optical power loss due to bending of the one or more optical fibers in tether cable 602. In an example embodiment, minimum radius $R_C$ is ~10 mm.

In an example embodiment illustrated in FIG. 34, central post 870 includes a curved wall portion 880 formed in wall 876 adjacent aperture 878 and having a bending radius RB. Curved wall portion 880 is curved so as to control the bending of tether cable 602 near proximate tether cable end 606 that passes through aperture 878 and into or through central post interior 877. Proximate tether cable end 606 can be attached to either transponder 30 or to optical fiber cable 220, e.g., through housing aperture 879. Note that curved wall portion 880 need not be circular, and in such a case can still be defined by a radius of curvature that represents the greatest amount of curvature (i.e., smallest radius).

In an example embodiment, curved wall portion 880 has radius of curvature $~R_B<5$ mm. For certain, bending-loss-resistant optical fibers such as those developed by Corning, Inc., a quarter-turn bend at 5 mm causes about a 0.025 dB power loss. Ten additional bends of such optical fiber at 10 mm would add about another 0.10 dB power loss.

Figure 35:
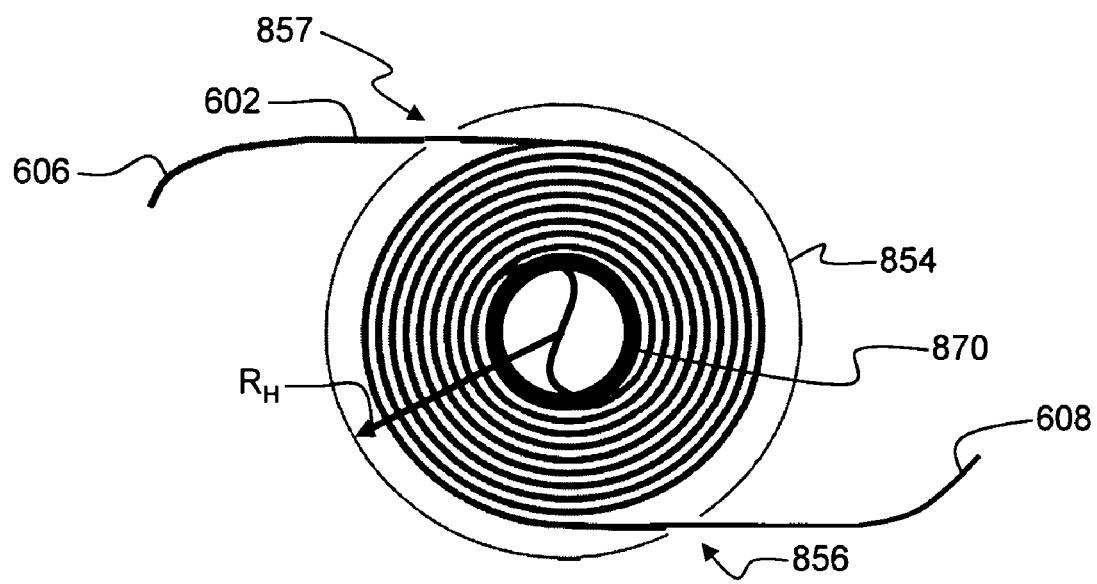
FIG. 35 is a top-down view similar to FIG. 34, but illustrating an example embodiment wherein the tether cable winds around the central post in both directions so that both tether cable ends can reside outside of the tether cable assembly housing.

FIG. 35 is a schematic diagram similar to FIG. 34, showing an example embodiment wherein housing 854 includes a second slot (aperture) 857 and tether cable 602 winds around central post 870 in both directions so that both tether cable ends 606 and 608 can reside outside of the tether cable assembly housing 854 when the tether cable is deployed.

Figure 36:
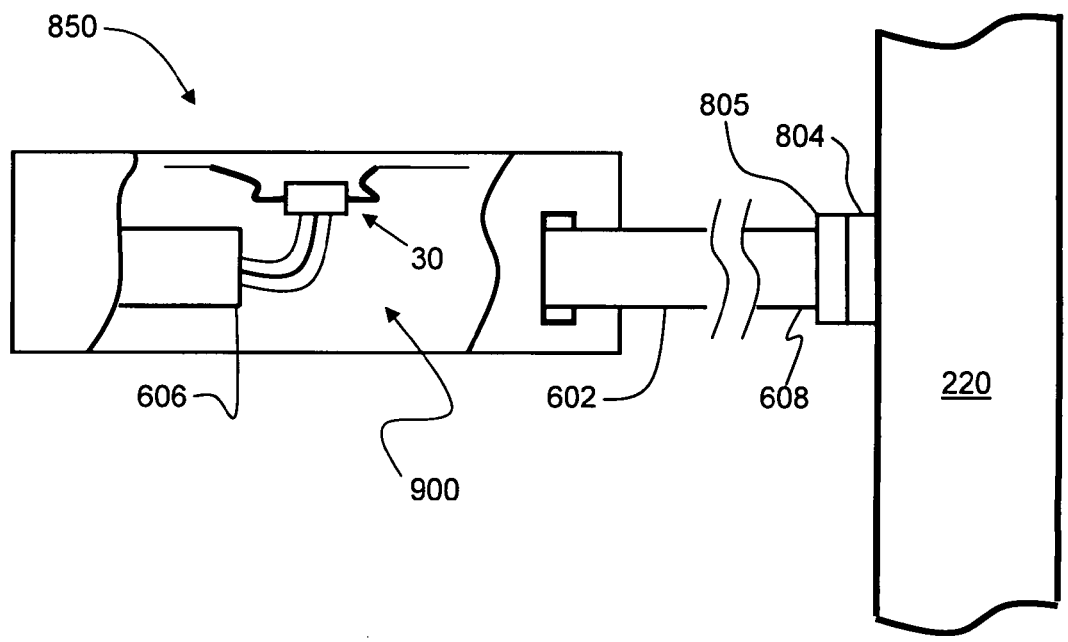
FIG. 36 is a schematic cut-away diagram of an example embodiment wherein the tether cable assembly includes a transponder and is used to connect the transponder to an optical fiber cable.

FIG. 36 is a schematic cut-away diagram of an example embodiment of wherein tether cable assembly 850 includes a transponder within its housing 854 and is used to connect the transponder to optical fiber cable 220. In FIG. 36, only some of the components of tether cable assembly 850 are shown for the sake of clarity in cut-away section 900. In the example embodiment of FIG. 36, transponder 30 is included within housing 854 and is operably coupled to tether cable 602 at proximate tether cable end 606 while tether cable distal end 608 is connected to optical fiber cable 220.

Figure 37:
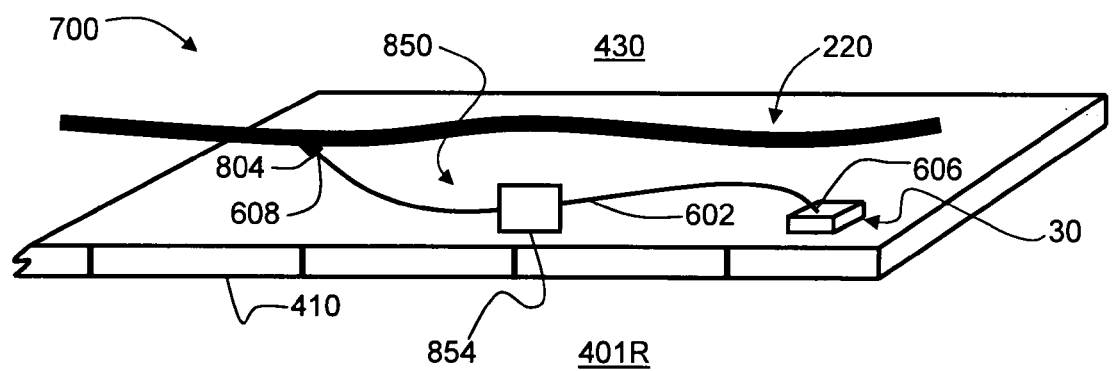
FIG. 37 is a schematic diagram similar to FIG. 29, showing how a tether cable assembly with the dual winding configuration of FIG. 35 is used to remotely connect a transponder to an optical fiber cable.

FIG. 37 is a schematic diagram similar to FIG. 29, illustrating an example embodiment of wherein tether cable assembly 850 is used to connect transponder 30 to optical fiber cable 220, wherein the tether cable assembly employs the tether-cable winding configuration illustrated in FIG. 35. Here, transponder 30 is located outside of tether cable housing 854. Note that tether cable 602 need not be coiled outside of housing 854 and that only as much tether cable as needed can be dispensed. Note that dispensing the tether cable from first and second slots 856 and 857 in housing 854 (FIG. 35) results in the tether cable assembly residing about half way between where tether cable distal end 608 connects to optical fiber cable 220 and where the tether cable proximal end 606 connects to the transponder.

Tether cable assembly 850 can be constructed to store various lengths of tether cable 602. By way of example, a tether cable assembly having a central post outer radius $R_O$ of 10.2 mm and a housing radius $R_H$ of 27.5 mm would have an extractable tether-cable length of about 500 mm for a cable thickness of 0.9 mm and 10 loops of the tether cable around spool 860. Tether cable assembly 850 has an extended tether-cable length of 1000 mm when housing radius $R_H$ is extended to 35 mm. Thus, a tether cable assembly 850 with a housing 854 having a diameter of just over 3 inches could store about a meter of tether cable 602.

The number of fibers or conductors carried by tether cable 602 may also be varied. In an example embodiment, a short length of spring steel (not shown) is included with or attached to tether cable 602 as the retracting element to provide sufficient tether-cable stiffness to deploy and retract the tether cable. The spring action required for the retraction of the tether could be provided by using copper clad steel wire, in which case the steel would be a spring steel such as silicon-manganese steel or chrome-vanadium steel.

In an example embodiment such as that shown in FIG. 36, a connector 805 that is mate-able with connector 804 of optical fiber cable 202 is provided at tether cable distal end 608 to provide for easy connection of tether cable 602 to optical fiber 202.

Tether cable assembly 850 has the advantage of being self-contained, compact, and is preferably constructed to be rugged. In an example application of tether cable assembly 850, after optical fiber cable 220 has been installed, the tether cables are attached to optical fiber cable 220 (and to transponder 30 if one is not included in the tether cable assembly). The tether cable is then dispensed (and locked, if necessary via locking mechanism 874) and the transponder and assembly placed in their desired final position. In the event that transponders 30 of a deployed RoF wireless picocellular system need to be upgraded with new transponders, the existing tether assemblies and transponders can be removed and replaced with new tether assemblies and transponders. The tether cable is adjusted to the desired length and any slack tether cable is neatly stored by coiling it around spool 860 within the assembly rather than atop the drop ceiling or other location where it might present a hazard or inconvenience.

Various embodiments of the present invention are adapted to include bend performance optical fibers. One example of bend performance optical fiber is a microstructured optical fiber having a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, and single mode operation at wavelengths preferably greater than or equal to 1500 nm, in some embodiments also greater than about 1310 nm, in other embodiments also greater than 1260 nm. The optical fibers provide a mode field at a wavelength of 1310 nm preferably greater than 8.0 microns, more preferably between about 8.0 and 10.0 microns. In preferred embodiments, optical fiber disclosed herein is thus single-mode transmission optical fiber.

In some embodiments of the present invention, the microstructured optical fibers disclosed herein comprises a core region disposed about a longitudinal centerline and a cladding region surrounding the core region, the cladding region comprising an annular hole-containing region comprised of non-periodically disposed holes, wherein the annular hole-containing region has a maximum radial width of less than 12 microns, the annular hole-containing region has a regional void area percent of less than about 30 percent, and the non-periodically disposed holes have a mean diameter of less than 1550 nm.

By "non-periodically disposed" or "non-periodic distribution", it is meant that when one takes a cross-section (such as a cross-section perpendicular to the longitudinal axis) of the optical fiber, the non-periodically disposed holes are randomly or non-periodically distributed across a portion of the fiber. Similar cross sections taken at different points along the length of the fiber will reveal different cross-sectional hole patterns, i.e., various cross-sections will have different hole patterns, wherein the distributions of holes and sizes of holes do not match. That is, the holes are non-periodic, i.e., they are not periodically disposed within the fiber structure. These holes are stretched (elongated) along the length (i.e. in a direction generally parallel to the longitudinal axis) of the optical fiber, but do not extend the entire length of the entire fiber for typical lengths of transmission fiber.

For a variety of applications, it is desirable for the holes to be formed such that greater than about 95% of and preferably all of the holes exhibit a mean hole size in the cladding for the optical fiber which is less than 1550 nm, more preferably less than 775 nm, most preferably less than 390 nm. Likewise, it is preferable that the maximum diameter of the holes in the fiber be less than 7000 nm, more preferably less than 2000 nm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

The optical fibers disclosed herein may or may not include germania or fluorine to also adjust the refractive index of the core and or cladding of the optical fiber, but these dopants can also be avoided in the intermediate annular region and instead, the holes (in combination with any gas or gases that may be disposed within the holes) can be used to adjust the manner in which light is guided down the core of the fiber. The hole-containing region may consist of undoped (pure) silica, thereby completely avoiding the use of any dopants in the hole-containing region, to achieve a decreased refractive index, or the hole-containing region may comprise doped silica, e.g. fluorine-doped silica having a plurality of holes.

In one set of embodiments, the core region includes doped silica to provide a positive refractive index relative to pure silica, e.g. germania doped silica. The core region is preferably hole-free. In some embodiments, the core region comprises a single core segment having a positive maximum refractive index relative to pure silica $\Delta_1$ in %, and the single core segment extends from the centerline to a radius R1. In one set of embodiments, $0.30\% < \Delta_1 < 0.40\%$, and $3.0$ µm<R1<5.0 µm. In some embodiments, the single core segment has a refractive index profile with an alpha shape, where alpha is 6 or more, and in some embodiments alpha is 8 or more. In some embodiments, the inner annular hole-free region extends from the core region to a radius R2, wherein the inner annular hole-free region has a radial width W12, equal to R2−R1, and W12 is greater than 1 µm. Radius R2 is preferably greater than 5 µm, more preferably greater than 6 µm. The intermediate annular hole-containing region extends radially outward from R2 to radius R3 and has a radial width W23, equal to R3−R2. The outer annular region 186 extends radially outward from R3 to radius R4. Radius R4 is the outermost radius of the silica portion of the optical fiber. One or more coatings may be applied to the external surface of the silica portion of the optical fiber, starting at R4, the outermost diameter or outermost periphery of the glass part of the fiber. The core region and the cladding region are preferably comprised of silica. The core region is preferably silica doped with one or more dopants. Preferably, the core region is hole-free. The hole-containing region has an inner radius R2 which is not more than 20 µm. In some embodiments, R2 is not less than 10 µm and not greater than 20 µm. In other embodiments, R2 is not less than 10 µm and not greater than 18 µm. In other embodiments, R2 is not less than 10 µm and not greater than 14 µm. Again, while not being limited to any particular width, the hole-containing region has a radial width W23 which is not less than 0.5 µm. In some embodiments, W23 is not less than 0.5 µm and not greater than 20 µm. In other embodiments, W23 is not less than 2 µm and not greater than 12 µm. In other embodiments, W23 is not less than 2 µm and not greater than 10 µm.

Such fiber can be made to exhibit a fiber cutoff of less than 1400 nm, more preferably less than 1310 nm, a 20 mm macrobend induced loss at 1550 nm of less than 1 dB/turn, preferably less than 0.5 dB/turn, even more preferably less than 0.1 dB/turn, still more preferably less than 0.05 dB/turn, yet more preferably less than 0.03 dB/turn, and even still more preferably less than 0.02 dB/turn, a 12 mm macrobend induced loss at 1550 nm of less than 5 dB/turn, preferably less than 1 dB/turn, more preferably less than 0.5 dB/turn, even more preferably less than 0.2 dB/turn, still more preferably less than 0.01 dB/turn, still even more preferably less than 0.05 dB/turn, and a 8 mm macrobend induced loss at 1550 nm of less than 5 dB/turn, preferably less than 1 dB/turn, more preferably less than 0.5 dB/turn, and even more preferably less than 0.2 dB-turn, and still even more preferably less than 0.1 dB/turn.

The fiber of some embodiments of the present invention comprises a core region that is surrounded by a cladding region that comprises randomly disposed voids which are contained within an annular region spaced from the core and positioned to be effective to guide light along the core region. Other optical fibers and microstructured fibers may be used in the present invention. Additional features of the microstructured optical fibers of additional embodiments of the present invention are described more fully in pending U.S. patent application Ser. No. 11/583,098 filed Oct. 18, 2006, and provisional U.S. patent application Ser. Nos. 60/817,863 filed Jun. 30, 2006; 60/817,721 filed Jun. 30, 2006; 60/841,458 filed Aug. 31, 2006; and 60/841,490 filed Aug. 31, 2006; all of which are assigned to Corning Incorporated and the disclosures of which are incorporated by reference herein.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A transponder system with enhanced antenna directivity, for use in a radio-over-fiber (RoF) wireless picocellular system, comprising:
    a transponder having a converter pair unit adapted to convert radio-frequency (RF) electrical signals into optical signals and vice versa, and an antenna system having at least one antenna element operably coupled to the converter pair unit; and
    at least one radiation-reflecting member arranged relative to the at least one antenna element so as to provide enhanced antenna directivity as compared to not having the at least one radiation-reflecting member,
    wherein each radiation-reflecting member is part of a radiation-reflector assembly having a support member that supports the radiation-reflecting member, and a mounting member that operably engages the support member, and
    wherein the at least one antenna element is incorporated into an optical fiber cable, and wherein the at least one radiation-reflector assembly is attached to the optical fiber cable relative to the at least one antenna element.

2. The transponder system of claim 1, wherein the at least one radiation-reflecting member is curved concave-wise relative to the transponder.

3. The transponder system of claim 1, further including an optical fiber cable, wherein the transponder is mounted to the optical fiber cable.

4. A transponder system with enhanced antenna directivity, for use in a radio-over-fiber (RoF) wireless picocellular system, comprising:
    a transponder having a converter pair unit adapted to convert radio-frequency (RF) electrical signals into optical signals and vice versa, and an antenna system having at least one antenna element operably coupled to the converter pair unit; and
    at least one radiation-reflecting member arranged relative to the at least one antenna element so as to provide enhanced antenna directivity as compared to not having the at least one radiation-reflecting member,
    wherein the antenna system includes a first antenna element adapted to transmit and receive RF radiation in a 5 GHz band having a corresponding center wavelength $\lambda_{RA}$, and a second antenna element adapted to transmit and receive RF radiation in a 2.4 GHz band having a corresponding center wavelength $\lambda_{RB}$, wherein operation on the 5 GHz band occurs while operation on the 2.4 GHz band occurs.

5. The transponder system of claim 4, including first and second radiation reflecting members arranged relative to the first and second antenna elements respectively, at respective distances DA and DB, wherein DA~$\lambda_{RA}$/4 and DB~$\lambda_{RB}$/4.

6. The transponder system of claim 4 wherein the at least one radiation-reflecting member is curved concave-wise relative to the transponder.

7. The transponder system of claim 4, further including an optical fiber cable, wherein the transponder is mounted to the optical fiber cable.

8. A method of providing enhanced antenna directivity for a radio-over-fiber (RoF) transponder for a wireless picocellular system, the transponder having an antenna system with at least one antenna element, the method comprising:
    arranging at least one radiation-reflecting member relative to the at least one antenna element so as to provide enhanced antenna directivity as compared to not having the at least one radiation-reflecting member, and
    providing a first antenna element adapted to transmit and receive RF radiation in a 5 GHz band having a corresponding center wavelength $\lambda_{RA}$, and providing a second antenna element adapted to transmit and receive RF radiation in a 2.4 GHz band having a corresponding center wavelength $\lambda_{RB}$, wherein operation on the 5 GHz band occurs while operation on the 2.4 GHz band occurs.

9. A method of providing enhanced antenna directivity for a radio-over-fiber (RoF) transponder for a wireless picocellular system, the transponder having an antenna system with at least one antenna element, the method comprising:
    arranging at least one radiation-reflecting member relative to the at least one antenna element so as to provide enhanced antenna directivity as compared to not having the at least one radiation-reflecting member,
    wherein the transponder includes a housing and wherein at least one antenna element is within a housing, and further including:

mounting the radiation-reflecting member atop the housing relative to the at least one antenna element, wherein the at least one antenna element is included within an optical fiber cable, and further including:

mounting the radiation-reflecting member on the optical fiber cable relative to the at least one antenna element.

10. The method of claim 9, wherein the at least one radiation-reflecting member is curved concave-wise relative to the transponder.

11. The method of claim 9, wherein the transponder is mounted to the optical fiber cable.

* * * * *